United States Patent [19]

Agrawal

[11] Patent Number: 6,081,816
[45] Date of Patent: Jun. 27, 2000

[54] METHOD FOR PLACING TEXT AROUND POLYGONS AND OTHER CONSTRAINTS

[75] Inventor: Siddharth Agrawal, Redmont, Wash.

[73] Assignee: Microsoft Corporation, Redmond, Wash.

[21] Appl. No.: 09/040,573

[22] Filed: Mar. 18, 1998

[51] Int. Cl.⁷ .................................................. G06F 17/00
[52] U.S. Cl. ........................... 707/521; 707/518; 707/519
[58] Field of Search .............................. 364/900; 707/521, 707/517, 518, 519, 520

[56] References Cited

U.S. PATENT DOCUMENTS

| 4,829,470 | 5/1989 | Wang | 364/900 |
| 5,214,755 | 5/1993 | Mason | 707/521 |

*Primary Examiner*—John E. Breene
*Assistant Examiner*—Tri H. Khong
*Attorney, Agent, or Firm*—Jones & Askew LLP

[57] ABSTRACT

An object-oriented text layout engine that implements an efficient two-pass text placement procedure. The interface allows the text layout engine to receive parameters that define the document space into which text is to be placed. The interface also allows the text layout engine to receive parameters that define one or more constraints around which the text is to be placed. The text layout engine then places the around the constraint within the document space and returns the text layout to the client program. The text layout engine may be configured in three components, a Fill Constrained Display Rectangle (FCDR) module, a Format Line module, and a Compute Unobstructed Spans (CUS) module. The FCDR module controls the operation of the text layout engine, interacts with the client program, and calls the Format Line and CUS modules as necessary. The CUS module receives a set of parameters that define a candidate rectangle and a constraint that may intersect the candidate rectangle. The CUS module breaks the candidate rectangle to avoid the constraint and returns zero or more unobstructed spans that do not intersect the constraint. The Format Line module receives text characters and a span definition and assigns the text characters to the span.

20 Claims, 13 Drawing Sheets

METHOD FOR PLACING TEXT AROUND POLYGONS AND OTHER CONSTRAINTS

TECHNICAL FIELD

This invention relates generally to the field of word processing and desktop publishing systems and, more particularly, to a portable, object-oriented text layout engine for placing text around polygons and other constraints.

BACKGROUND OF THE INVENTION

Software programs for creating text-based documents, such as word processing and desktop publishing programs, often allow the author of a document to incorporate visual elements, such as pictures, charts, and graphs into documents. The author of the document typically places the visual elements in the desired locations, and a text layout routine automatically places the text around the visual elements. Certain text-processing programs place text around a visual element by first surrounding the visual element with a "bounding rectangle," which serves as a constraint, around which the text layout routine places the text. The bounding rectangle is selected such that the entire visual element is located within the bounding rectangle.

Using bounding rectangles as text-layout constraints can make the resulting document difficult to read when the visual elements have jagged or uneven shapes. In this situation, bounding rectangles surrounding the visual elements may leave relatively large areas of blank space in certain lines of text. Forcing a reader's eye to jump over these blank spaces makes the text difficult to read and increases the page space required to display the document. These shortcomings are exaggerated when a visual element has a serpentine shape or includes empty interior spaces.

Text-based documents have improved readability, require less display space, and take on a professional, polished appearance when the text wraps around, or form-fits, to the shape of the visual elements. To form-fit text to the shape of visual elements within a document, a constraint that follows the edge of the visual element typically is defined first. A text layout routine may then place the text around the constraint. Text-processing programs have been developed with the ability to bound visual elements with polygon constraints. Text layout routines within these programs have also been developed with the ability to place text around the polygon constraints.

However, these prior text-processing programs experience a number of shortcomings. A first shortcoming arises when the text is rendered in a "rich-text" format. Rich-text formatting allows the user to change the properties of text, such as color, style, font type, and font size, on a character-by-character basis. Text rendered in a rich-text format can therefore vary in height and width depending on the font size and type, as well as other formatting options, including bold, subscript, superscript, and so forth. Moreover, changing the width of the field into which a rich-text string is placed can alter the height of the text string. For this reason, breaking a rich-text string into a number of horizontal spans to fit around one portion of a constraint can cause the text to increase in height and overlap another portion of the constraint.

Prior text-processing programs are not configured to address the problems caused by rich-text formatting. As a result, text that is intended to wrap around a visual element may, in fact, overlap the constraint and interfere with the visual element. This problem can be overcome by increasing the required clearance between the constraint and the text, but this solution decreases the precision of text placement and, thus, reduces the readability of the text. Alternatively, the text layout engine may search iteratively for an acceptable text placement.

For example, each time an attempted text placement overlaps a constraint, the text layout engine may invalidate that text placement solution and attempt another solution. Because the text layout routine takes some time to perform its task, causing the text layout routine to search iteratively for text placement solutions can slow the text-processing program to the point of unacceptable performance. The processing speed of the text layout routine can usually increased only at the cost of decreased text-placement precision. At present, text-processing programs can be improved both in processing speed and in text-placement precision.

Another problem results from the nonportability of previous text layout routines. A software development company, such as MICROSOFT, may have a number of text-processing application programs that use text layout routines. For example, a word processing program, a desktop publishing program, a program for creating Internet home pages, may each use a text layout routine. At present, each application program includes its own text layout routine, which is embedded within the program code and tailored to its particular host application program. Maintenance must therefore be performed for the text layout routines of each program individually. For this reason, it is cumbersome to maintain and upgrade the text layout routines. In addition, each text layout routine may operate somewhat differently, which may confuse or aggravate a user who has more than one of the application programs.

There is, therefore, a need in the art for a text layout program having improved processing speed and text-placement precision for use with rich-text documents. There is a further need for a portable text layout program that may be accessed by an number of different text-processing application programs.

SUMMARY OF THE INVENTION

The present invention meets the needs described above in a text layout engine that implements a two-pass text placement procedure. The text layout engine breaks a candidate rectangle, which corresponds to a line of text, into a number of unobstructed spans for receiving the text. The two-pass text placement procedure allows the text layout engine to take account of height changes that may occur as a result of changing the width of the fields for rich-text characters. The text layout engine thus determines the required height of each unobstructed span before attempting to add text to the spans. The height of the spans may be refined, and the vertical position of the candidate rectangle may be adjusted, if necessary, before the text is added to the spans. In addition, iterative text placement attempts are not required. Rather, the text layout engine identifies an acceptable set of unobstructed spans for a line of text before attempting to add the text to the spans.

The improved text layout engine may be coded in an object-oriented configuration that exposes a predefined interface. The interface generalizes the text layout engine and, thus, allows a variety of text-processing programs to access the new text layout engine. The same text layout engine therefore works with a word processing program, a desktop publishing program, a program for creating Internet home pages, and so forth. The text layout engine operates the same way in connection with each program, and maintenance no longer has to be performed for the text layout modules of each program individually.

Generally described, the invention is a text layout engine configured to receive a first width, a character position, and a vertical position associated with a candidate rectangle. The text layout engine also receives parameters defining a constraint that intersects with the candidate rectangle. The text layout engine typically receives these parameters from a client program, such as a word processing program or a desktop publishing program. The constraint may include a polygon, a plurality of polygons, or a smooth curve. In addition, the constraint may include the exterior of a polygon such that the second text string is assigned to the interior of the polygon.

The text layout engine fits a first text string to the candidate rectangle and determines a first height associated with the first text string. The text layout engine conducts a preliminary text assignment to identify an unobstructed span associated with a second height. The text layout engine then compares the second height to the first height. If the second height is equal to the first height, the text layout engine assigns a second text string to the unobstructed span. If the second height is greater than the first height, the text layout engine declares the candidate rectangle invalid and advances the vertical position by a predetermined amount, typically one-half of the document's line spacing. If the second height is less than the first height, the text layout engine refines the unobstructed span.

The text layout engine may identify the unobstructed span by excluding from the candidate rectangle a portion of the candidate rectangle that intersects with the constraint. The text layout engine then determines the second height by fitting the second text string to the unobstructed span. In addition, before assigning the second text string to the unobstructed span, the text layout engine may determine whether the second text string ends in a delimiter. If the second text string does not end in a delimiter indicating a complete word or a properly hyphenated word, the text layout engine may not add the second text string to the unobstructed span.

The text layout engine may refine the unobstructed span by defining a second candidate rectangle having the first width and the second height. The text layout engine identifies a second unobstructed span corresponding to the second candidate rectangle by excluding from the second candidate rectangle the portion of the second candidate rectangle that intersects with the constraint. The text layout engine fits a third text string to the second unobstructed span and determines a third height associated with the third text string. The text layout engine then compares the third height to the second height. If the third height is equal to or less than the second height, the text layout engine assigns the third text string to the second unobstructed span. If the third height is greater than the second height, the text layout engine declares the second candidate rectangle invalid and advances the vertical position by a predetermined amount.

The text layout engine may identify the unobstructed span by determining intersections between the constraint and an infinite horizontal line. Based on the intersections between the constraint and an infinite horizontal line, the text layout engine excludes interior portions of the constraint from the candidate rectangle. The text layout engine also excludes from the candidate rectangle portions of the candidate rectangle that overlap with edges associated with the constraint. The text layout engine also excludes from the candidate rectangle portions of the candidate rectangle that are within a predefined left clearance criterion from a left edge associated with the constraint. The text layout engine also excludes from the candidate rectangle portions of the candidate rectangle that are within a predefined right clearance criterion from a right edge associated with the constraint. The text layout engine may also determine whether the unobstructed span has a width that is at least as large as a predefined minimum width criterion.

The text layout engine may determine intersections between the constraint and an infinite horizontal line by initializing an intersection array and also initializing the horizontal line to pass through a bottom side of the candidate rectangle. For each line segment of the polygon, the text layout engine determines an intersection type between the horizontal line and the line segment. If the intersection type is a tip intersection, the text layout engine raises the horizontal line a predetermined amount and clears the intersection array. If the intersection type is a simple intersection, the text layout engine adds the point of intersection to the intersection array. If the intersection type is a collinear intersection, the text layout engine adds the vertices associated with the line segment to the intersection array.

The text layout engine then excludes interior portions of the constraint from the candidate rectangle by applying an odd-parity rule to the information in the intersection array. If the horizontal line passes through a top side associated with the candidate rectangle and the intersection type is a vertex intersection, indicating that the odd-parity rule cannot be used, the text layout engine excludes from the candidate rectangle a portion defined by an extreme left intersection to an extreme right intersection in the intersection array.

According to an aspect of the invention, the text layout engine includes a first module for receiving text characters, constraint parameters, a page width, and a character position from the client module and returning to the client module the text characters placed around the constraint. The text layout engine also includes a second module for receiving the page width and the character position from the first module, fitting a portion of the text characters to a candidate rectangle corresponding to the page width and the character position, and returning to the first module a height associated with the text characters fit to the candidate rectangle. The text layout engine also includes a third module for receiving the candidate rectangle and the constraint parameters from the first module, identifying unobstructed spans corresponding to the candidate rectangle by excluding from the candidate rectangle a portion of the candidate rectangle that intersects with the constraint.

That the invention improves over the drawbacks of prior text layout programs and accomplishes the advantages described above will become apparent from the following detailed description of the illustrative embodiment and the appended drawings and claims.

DETAILED DESCRIPTION OF EXEMPLARY EMBODIMENTS

Figure 1:
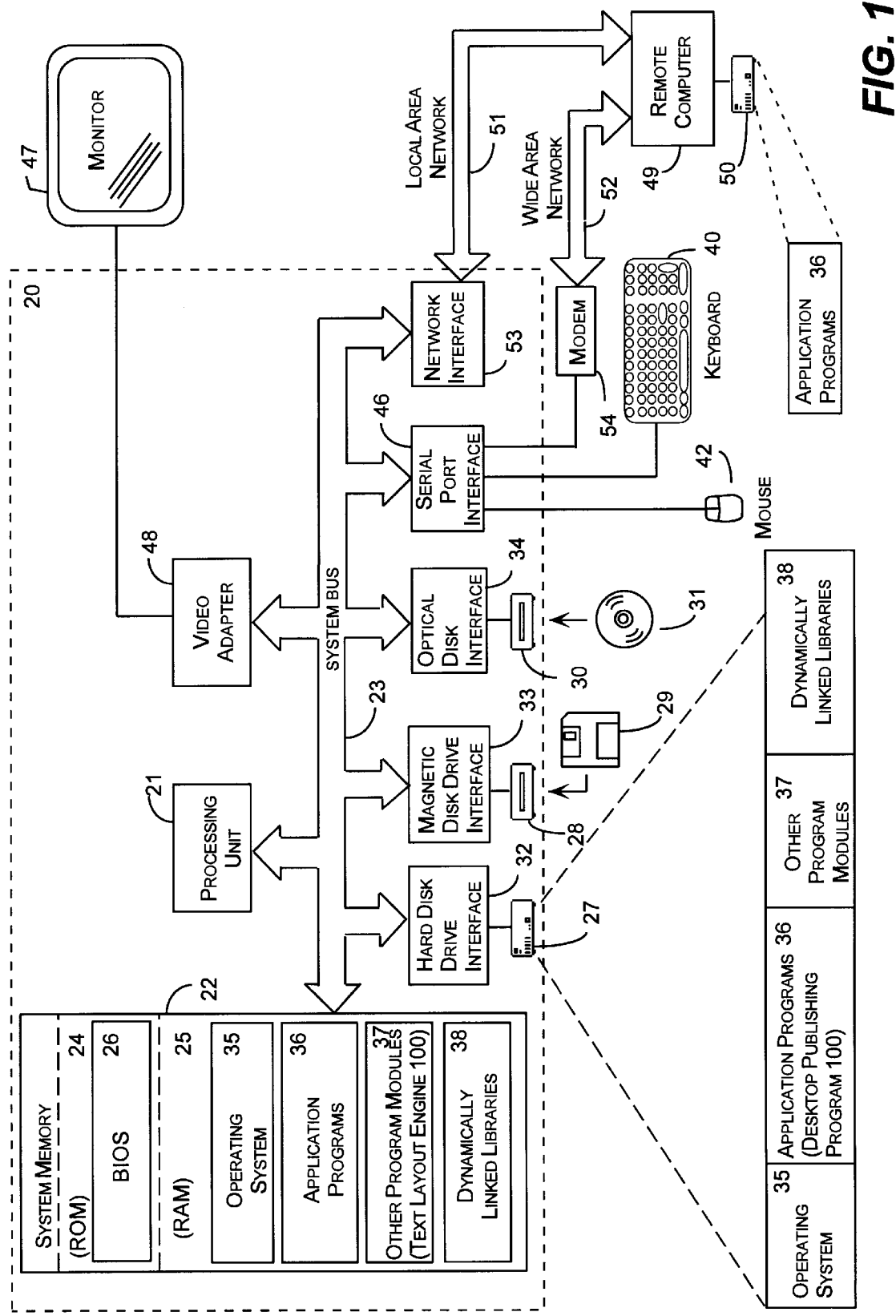
FIG. 1 is a functional block diagram of a personal computer system that provides the operating environment for the illustrative embodiment of the invention.

The invention is preferably be implemented as an object-oriented text layout engine that implements an efficient two-pass text placement procedure. As an object-oriented program module, the text layout engine exposes a standardized interface that client programs may access to communicate with the text layout engine. The object-oriented architecture permits a number of different text-processing client programs, such as a word processing program, a desktop publishing program, a program for creating Internet home pages, and so forth, to use the text layout engine.

The interface exposed by the text layout engine allows the engine to receive parameters that define the document space into which the engine is to place the text received from the client program. The interface also allows the text layout engine to receive parameters that define one or more constraints around which the text is to be placed. The text layout engine then places the text around the constraints within the document space and returns the text layout to the client program.

The text layout engine may be configured in three components, a Fill Constrained Display Rectangle (FCDR) module, a Format Line module, and a Compute Unobstructed Spans (CUS) module. The FCDR module controls the operation of the text layout engine, interacts with the client program, and calls the Format Line and CUS modules as necessary. The CUS module receives a set of parameters that define a candidate rectangle and a constraint that may intersect the candidate rectangle. The CUS module breaks the candidate rectangle to avoid the constraint and returns zero or more unobstructed spans that do not intersect the constraint. The Format Line module receives text characters and a span definition and assigns the text characters to the span. The FCDR and CUS modules are new to the illustrative embodiment of the present invention, whereas the Format Line module may be a conventional rich-text primitive for assigning rich-text characters to a defined span.

The FCDR module receives the width of the document space and the current vertical and horizontal position character position from the client program. The character position is the starting place for text placement and the width is the full-width distance from the left edge of the document space to the right edge of the document space. The width may be the distance from the left page margin to the right page margin or, in a multi-column format, the distance from the left column margin to the right column margin. The width and character position define the width of a candidate rectangle into which the text layout engine will place the text. To determine the height of the candidate rectangle, the FCDR module calls the Format Line module to make a preliminary assignment of text to the full-width candidate rectangle.

As part of the function call, the FCDR module passes the Format Line module the width and character position for the current line of the document, which the Format Line module uses to perform its text-assignment function. The Format Line module returns a number of parameters, including the height of the candidate rectangle and the height, baseline position, bottom clearance, and top clearance for the characters. The height of the candidate rectangle is determined by the assigned text characters, which may include rich-text features that affect the height of the characters. For example, the font and size of the text may be set on a character-by-character basis. In addition, a number of style properties, such as bold, italics, subscript, and superscript, can also affect the height of the characters. As a result, once a full-width candidate rectangle is broken into a number of spans, it is possible for the height of individual spans to differ from the height of the full-width candidate rectangle. Furthermore, the Format Line module could return a different height for an individual span if a single character is added to, or deleted from, the span.

Once the FCDR module has a candidate rectangle for a line of text with a defined width and height, which may be designated as W1 and H1, the candidate rectangle may be broken into unobstructed spans to avoid the constraint. To obtain the unobstructed spans, the FCDR module calls the CUS module and passes the candidate rectangle and the constraint parameters. Alternatively, the CUS module may obtain the constraint parameters directly from the client program. In the illustrative embodiment, the constraint parameters are the vertices of polygons received from the client program, but the text layout engine may be easily modified to process other shapes including smooth curves.

The CUS module constructs the spans as horizontal sections of the candidate rectangle. Thus, the CUS module returns zero or more unobstructed spans for the candidate rectangle, which corresponds to the current line of the document. Each span has the height H1 set by the Format Line module and a width set by the CUS module. The CUS module applies three criteria when setting the width W2, a left clearance distance from the constraint LEFTAWAY, a right clearance distance from the constraint RIGHTAWAY, and a minimum width value for the span MNWIDTH.

After the FCDR module obtains the unobstructed spans for a line of text, the FCDR module calls the Format Line module to assign text to each unobstructed span and passes the width of the each span to the Format Line module. The Format Line module returns the usual parameters, baseline position, height of the characters, and so forth, including the maximum height H2 for the spans in the current line of the document. If the Format Line module returns a maximum height for the unobstructed spans that is different from H1, the height returned for the preliminary text assignment, this may indicate one of two conditions: (1) the size of the spans may be reduced; or (2) at least one of the spans is too small to accept the assigned text. The FCDR module therefore compares the height returned for the preliminary text assignment H1 to the height for the unobstructed span H2. If H2 is less than H1, then the FCDR module refines the spans for the candidate rectangle. If H2 is greater than H1, then the FCDR module declares the line invalid and advances the vertical position by a predetermined amount, such as one-half of the line spacing for the document.

Although there may be more than one unobstructed span for the candidate rectangle, and each span may have a different width and height, an illustrative unobstructed span having a width W2 and height H2 will be referred to for simplicity. To refine the span, the FCDR module calls the CUS module and passes to it the with and the height of a refined candidate rectangle with dimensions W1, H2. The CUS breaks the refined candidate rectangle into zero or more unobstructed spans to avoid the constraint. An illustrative unobstructed span having a width W3 and height H2 will be referred to for simplicity. The FCDR module then calls the Format Line module and passes to it the width of the spans corresponding to the refined candidate rectangle, represented by a span having a width W3. The Format Line module assigns text to the span and returns the usual parameters, including a new height for the span, H3. The FCDR module then compares H3 to H2. If H3 is less than or equal to H2, then the FCDR module retains the text assignment for the span. But if H3 is greater than H2, the FCDR module does not retain the text assignment for the span. In addition, if H3 is greater than H2 for the first span of the line, the FCDR module declares the line invalid and advances the vertical position by a predetermined amount, such as one-half of the line spacing for the document.

If H2 is equal to H1, or if H3 is less than or equal to H2 for the first span of the line, the FCDR module adds the text assigned by the Format Line module one span at a time, checking to determine whether the text assigned to the span ends in a delimiter indicating the end of a word or a properly hyphenated word. If the text assigned to a span does not end in a delimiter, the FCDR module does not add the text to the span and, instead, calls the Format Line module to reassign the text to the remaining spans in the line. Once text has been assigned to each unobstructed span in the current line of the document, the FCDR module aligns the baselines for the text assigned the spans. The FCDR module then processes the next line of the document, repeating the procedure until all of text has been processed. When text processing is complete, the FCDR module returns the text layout to the client program.

The two-pass text placement procedure described above allows the text layout engine to determine the appropriate height and width for each span of a candidate rectangle before attempting to add the text to the spans. Rich-text characters are placed around the constraint without causing the characters to overlap the constraint and without having to resort to an iterative text placement procedure. For candidate rectangles that cannot accept text, the text layout engine advances the vertical position by a predefined amount, such as one-half of the line spacing for the document, until the candidate rectangle is large enough the accept text. These features allow the text layout engine to exhibit improved processing speed and text placement precision, as compared to previous text layout modules.

Turning now to the methodology for constructing unobstructed spans by excluding portions of the candidate rectangle that intersect with a constraint, the CUS module constructs each span as a horizontal section of candidate rectangle. In the illustrative embodiment, the constraint may include more than one polygon. Accordingly, the CUS module processes the polygons one at a time, excluding from the candidate rectangle the portions that intersect with each polygon. In this manner, the CUS module may process any number of polygons and produce a set of unobstructed spans that does not intersect any of the polygons.

For a particular polygon, the CUS module excludes portions of the candidate rectangle by calling an Exclude Span routine, which constructs a span array. Each span is a portion of the candidate rectangle denoted by its left and right horizontal coordinates. The span array is initialized with the far left and right horizontal coordinates of the candidate rectangle. Portions of the candidate rectangle are then excluded by adding additional horizontal coordinates to the span array. When the Exclude Span routine has completed the span array, the first two horizontal coordinates define the far left span, the next two horizontal coordinates define the next span, and so forth moving from left to right across the candidate rectangle.

The CUS module uses three techniques to avoid intersections between the candidate rectangle and a polygon constraint. The first technique involves determining intersections between the polygon constraint and an infinite horizontal line, a mathematical construct. This first technique allows the CUS module to handle situations in which the candidate rectangle is located entirely within the polygon, and situations in which the polygon wraps around the candidate rectangle.

As part of the first technique, the CUS module applies an "odd-parity rule" to the entries in an intersection array, which is a conventional computer graphics technique for determining which portions of the candidate rectangle are on the interior of the polygon. The odd-parity rule can be applied with minimal complication if the infinite horizontal line intersects the edges, or line segments, of the polygon rather than the vertices. That is, application of the odd-parity rule is most straight forward when each intersection between the polygon and the infinite horizontal line has an entry point and an exit point. Therefore, the first technique also involves identifying an infinite horizontal line through the candidate rectangle that does not intersect with a vertex of the polygon.

The second technique applied by the CUS module involves excluding portions of the candidate rectangle that intersect with an edge of the polygon. In other words, the portion of the candidate rectangle from the horizontal coordinate of the first edge intersection point to the horizontal coordinate of the second edge intersection point is excluded from the candidate rectangle. If one or both of the vertices of the line segment is located within the candidate rectangle, then the portion of the candidate rectangle up to the horizontal coordinate of the enclosed vertex is excluded from the candidate rectangle.

The third technique applied by the CUS module, which is applied by the Exclude Span routine, involves applying three span criteria to each span. The span criteria are MINWIDTH, LEFTAWAY, and RIGHTAWAY. MIN- WIDTH sets a minimum width for a span, LEFTAWAY sets a minimum clearance between the span and the left edge of the constraint, and RIGHTAWAY sets a minimum clearance between the span and the right edge of the constraint. For example, MINWIDTH may be set to ⅛ inch (0.64 cm), LEFTAWAY may be set to zero, and RIGHTAWAY may be set to zero. For this convention, LEFTAWAY and RIGHTAWAY are to zero to obtain the closest fit, which works well if the routine that bounds a visual element by a polygon constraint leaves a small clearance between the visual element itself and the constraint. Alternatively, LEFTAWAY may be automatically set equal to the right page margin, and RIGHTAWAY may be automatically set equal to the left page margin. This convention causes the text to flow around constraints in the same manner as the text flows around the page boundaries. Although the MINWIDTH, LEFTAWAY, and RIGHTAWAY criteria are typically set during program development, a user interface tool, such as a tool bar item or a pop-up window, may alternatively be provided to allow a user to set the span criteria on a case-by-case basis.

Exemplary Operating Environment

FIG. 1 and the following discussion are intended to provide a brief, general description of a suitable computing environment in which the invention may be implemented. While the invention will be described in the general context of a desktop publishing software program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the other program modules is a text layout engine 100 that includes certain embodiments of the invention, which are described below with reference to FIGS. 2–12. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are incorporated into the PUBLISHER 98 and Greetings Workshop 2.0 application programs sold by Microsoft Corporation on CD-ROM for use with personal computer systems such as the illustrative personal computer 20. The invention may be deployed within, or in connection with, the OFFICE 97 suite of application programs including, among others, a WORD 97 word processing application program. It will be appreciated that the principles of the invention are not limited to desktop publishing software programs, but could equivalently be applied to any computer-implemented system that involves the use of predefined document layouts.

For example, the invention may be implemented within a system that allows the user to extract objects from a document, such as a system that allows the user to drag headlines, footers, or the like from a desktop publishing document and to drop these objects into a file in another program module. In this case, the object property propagation rules defined by the desktop publishing program may be automatically applied to the extracted objects after they are dropped into the file in the other program module. In addition, it is anticipated that the invention may be deployed in connection with future versions of Microsoft's word processing application programs, slide-show presentation application programs, and so forth. It will be further appreciated that the invention could equivalently be implemented on host computers other than personal computers, and could equivalently be transmitted to the host computer by means other than a CD-ROM, for example, by way of the network connection interface 53.

Notwithstanding the broad applicability of the principles of the invention described above, it should be understood that the configuration of the exemplary embodiment as an application program for widely-used personal computers provides significant advantages. In particular, the text layout engine 100 described in this specification is specifically designed to exhibit acceptable memory-use and performance characteristics when implemented on the conventional personal computer system 20. In so configuring the text layout engine 100, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

The Text Layout Engine

As noted previously, rich-text formatting allows the user to change the properties of the text, such as color, style, font type, and font size, on a character-by-character basis. Text rendered in a rich-text format can therefore vary in height and width depending on the font size and type, as well as other formatting options, including bold, subscript, superscript, and so forth. Moreover, changing the width of the field into which a rich-text string is placed can alter the height of the text string. For this reason, breaking a rich-text string into a number of horizontal spans to fit around one portion of a constraint can cause the text to increase in height and overlap another portion of the constraint.

The text layout engine 100 implements a two-pass text placement technique to place the rich-text characters within unobstructed spans without causing the characters to overlap the constraints, and without resorting to an iterative text placement process. This two-pass text placement technique allows the text layout engine 100 to exhibit improved processing speed and text placement precision, as compared to previous text layout modules. FIGS. 2A–4B illustrate several text placement operations that may be performed by the text layout engine 100. The component architecture of the text layout engine 100 is described with respect to FIG. 5, and the methodology implemented by the text layout engine is described with reference to FIGS. 6–13.

Figure 2A:
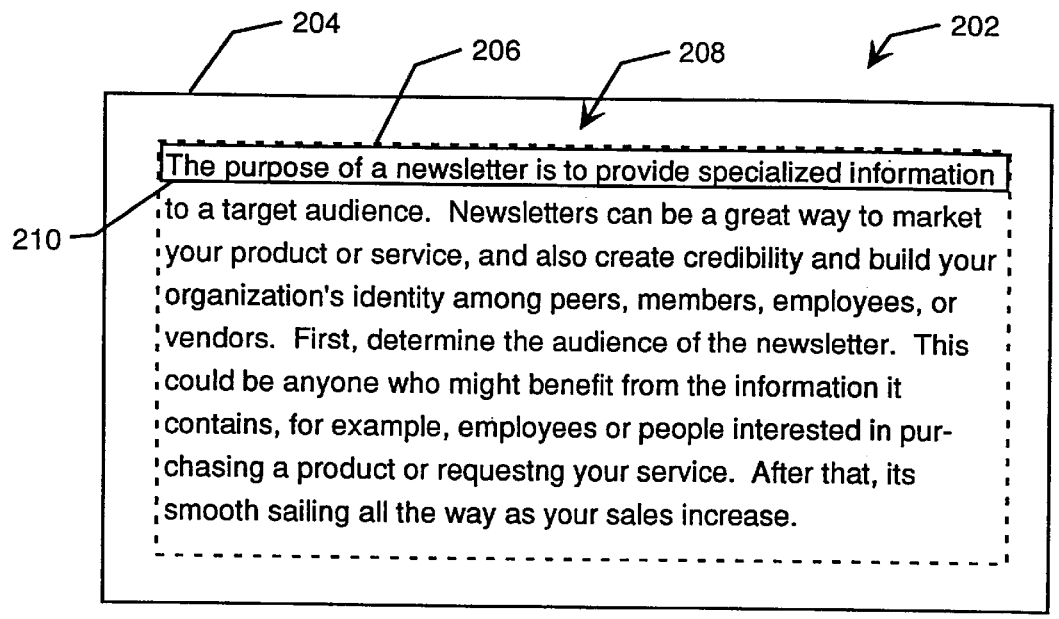
FIG. 2A is a diagram that illustrates a sample of text before the text has been placed around two polygon constraints.

FIG. 2A is a diagram that illustrates a sample of text 202, which may include rich-text characters, before the text has been placed around a polygon constraint. FIG. 2A shows a document page 204 including a document space 206 into which text characters may be placed. The first line of the text 208 is located within a candidate rectangle 210, which extends from the left edge of the document space 206 to the right edge of the document space. It is well known to use a conventional text placement primitive, such as the Format Line module described with reference to FIG. 5, to place the line of text 208 within a span, such as the candidate rectangle 210.

Figure 2B:
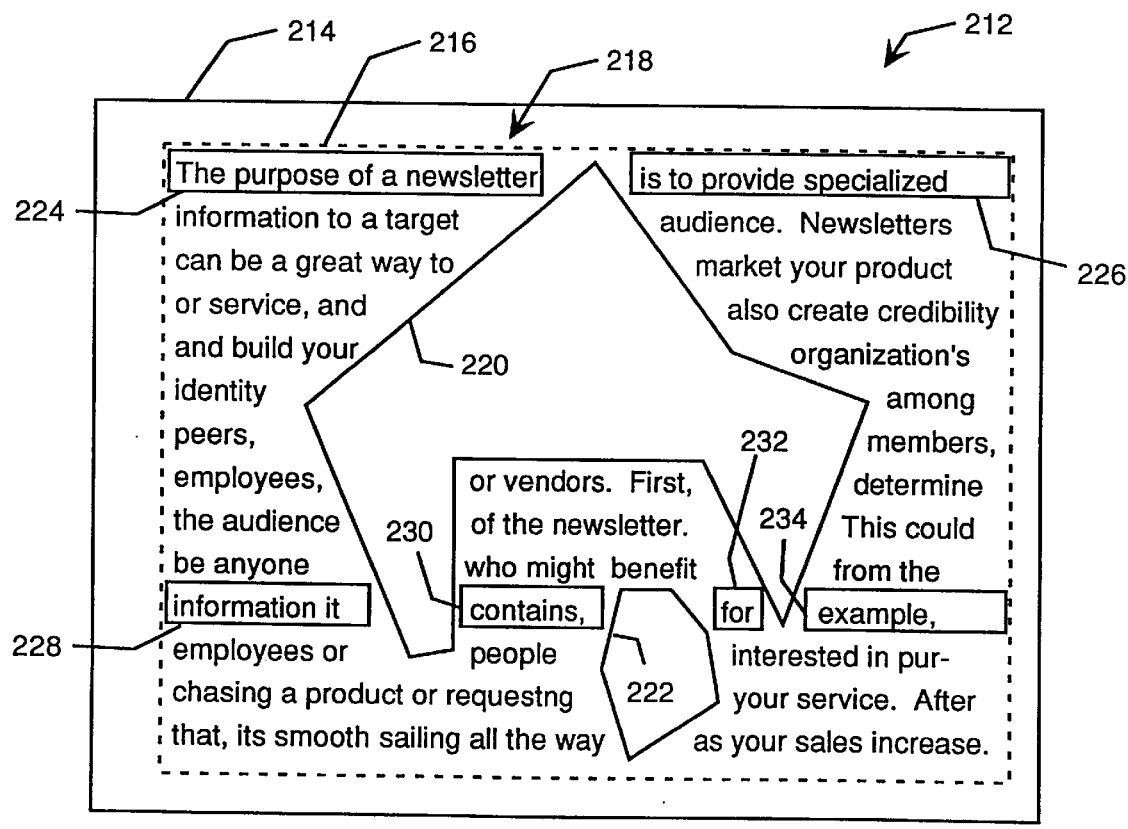
FIG. 2B is a diagram that illustrates a sample of text after the text has been placed around two polygon constraints.

FIG. 2B is a diagram that illustrates a sample of text 212 corresponding to the rich-text characters 202 after the text has been placed around two polygon constraints 220 and 222. FIG. 2B shows a document page 214 including a document space 216 into which the text characters may be placed. The first line of the text 218 is located within a pair of unobstructed spans 224 and 226, which extends from the left edge of the document space 216 to the right edge of the document space without intersecting the polygon constraint 220. Another line of text is shown broken into four unobstructed spans, 228, 230, 323, and 234. This line of text has been broken to avoid both polygon constraints 220 and 222. The text layout engine 100 performs the operations necessary to place rich-text characters, such as the text 212, around constraints, such as the polygon constraints 220 and 222.

Figure 3A:
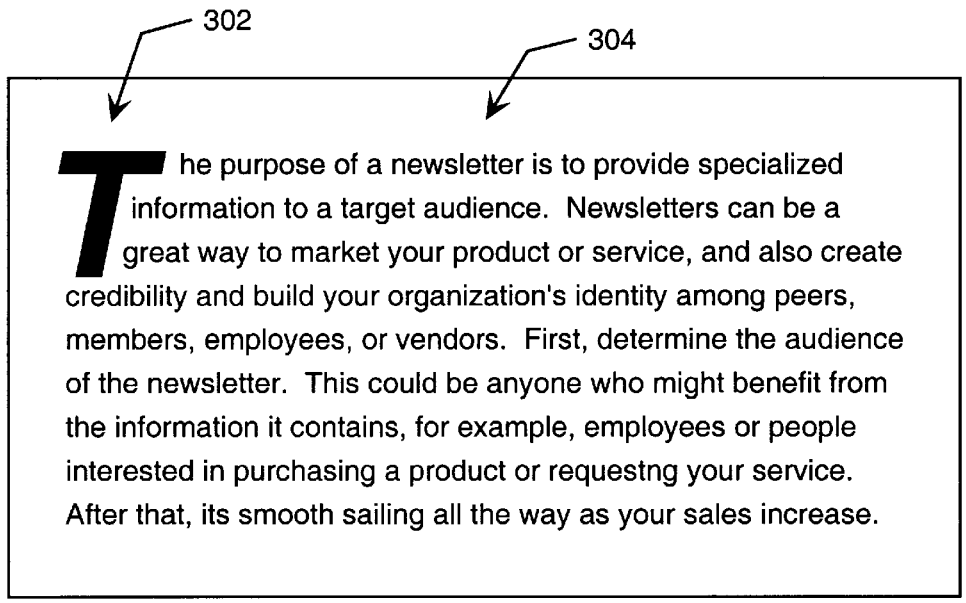
FIG. 3A is a diagram that illustrates a sample of text placed around a large initial capital letter known as a "drop cap."

FIG. 3A is a diagram that illustrates another capability of the text layout engine 100, placing text characters 304 to conform to the shape of a large initial capital letter 302 known as a "drop cap." Conforming rich-text characters to the shape of a drop-cap is an example of placing text around a constraint in the shape of the drop-cap.

Figure 3B:
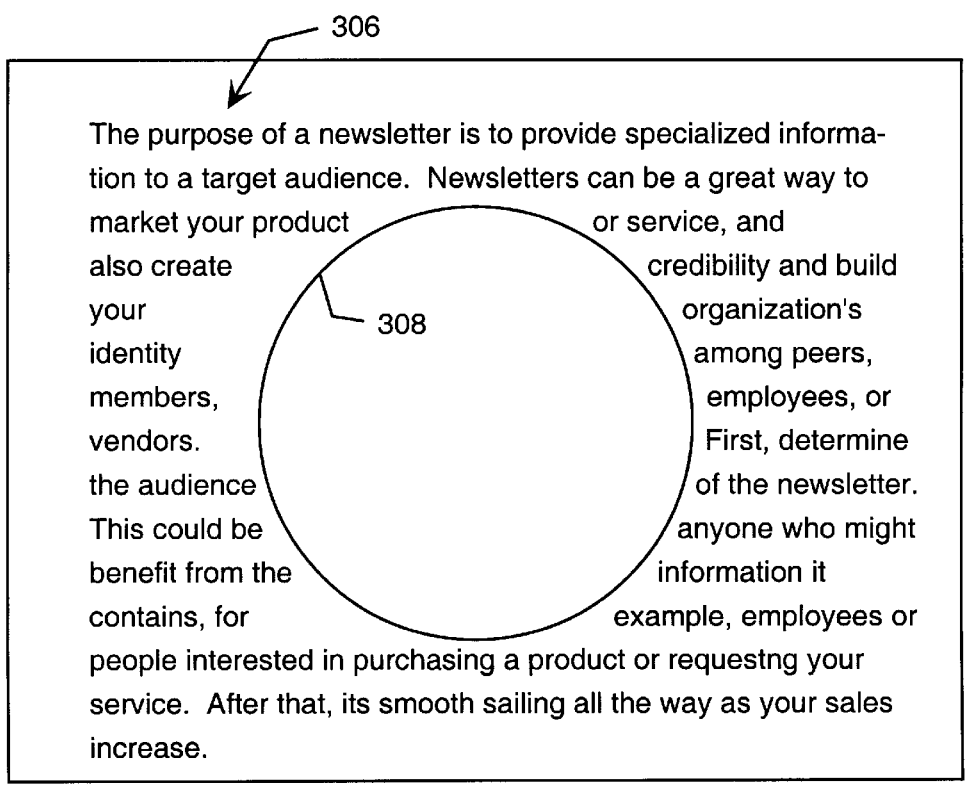
FIG. 3B is a diagram that illustrates a sample of text placed around a smooth-curve constraint.

FIG. 3B is a diagram that illustrates another capability of the text layout engine 100, placing text characters 304 to conform to the shape of a smooth-curve constraint 308, which is a circle in the example of FIG. 3B. Although the specific methodology for the text layout engine described with reference to FIGS. 6–13 pertains to polygon constraints, those skilled in the art will appreciate that the described methodology may be easily modified to handle a smooth-curve constraint, such as a drop-cap letter "D" or the circle shown in FIG. 3B.

Figure 4A:
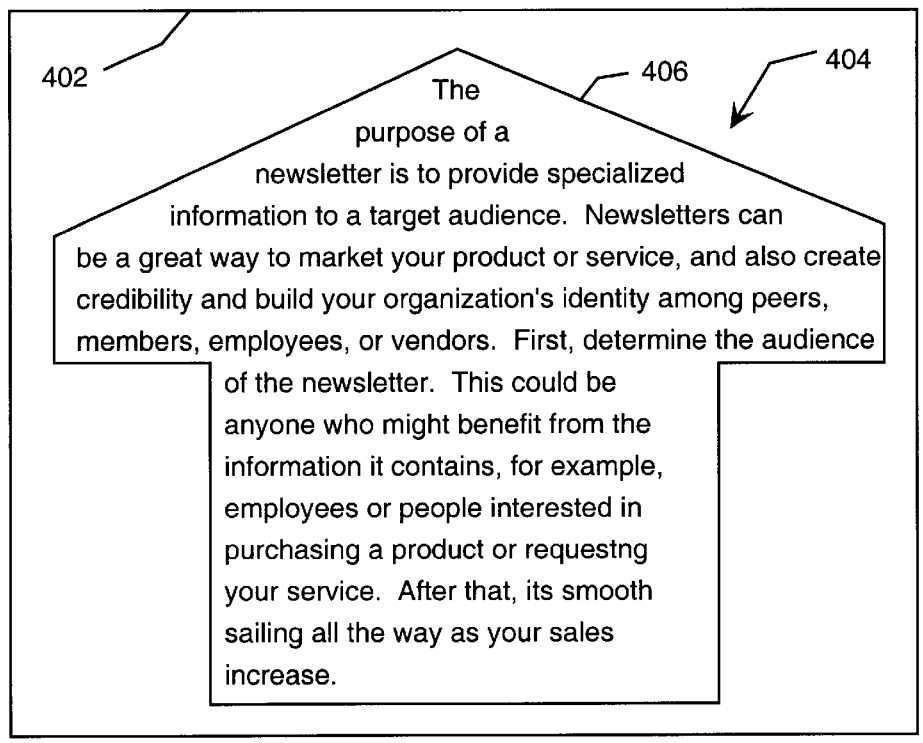
FIG. 4A is a diagram that illustrates a sample of text placed inside a polygon constraint.
Figure 4B:
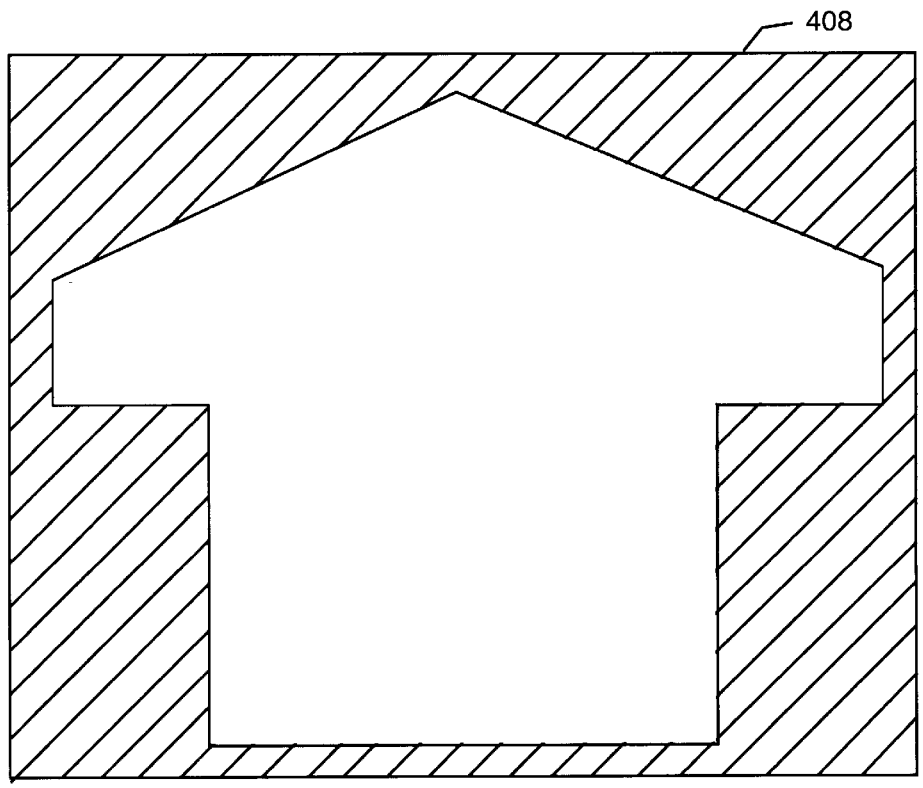
FIG. 4B is a diagram that illustrates an external polygon constraint for use in placing the text shown in FIG. 4A.

FIG. 4A is a diagram that illustrates yet another capability of the text layout engine 100, placing text characters 404 within the interior of a polygon constraint 406. The polygon constraint 406 is located within a document space 402. As shown in FIG. 4B, placing the text characters 404 within the interior of the constraint 406 is a variation of placing the text characters 404 to exclude a corresponding constraint 408, which is defined as the exterior portion of the constraint 406. That is, the text may be placed to exclude the constraint 408, which is defined as the space between the constraint 406 and the edge of the document space 402.

Figure 5A:
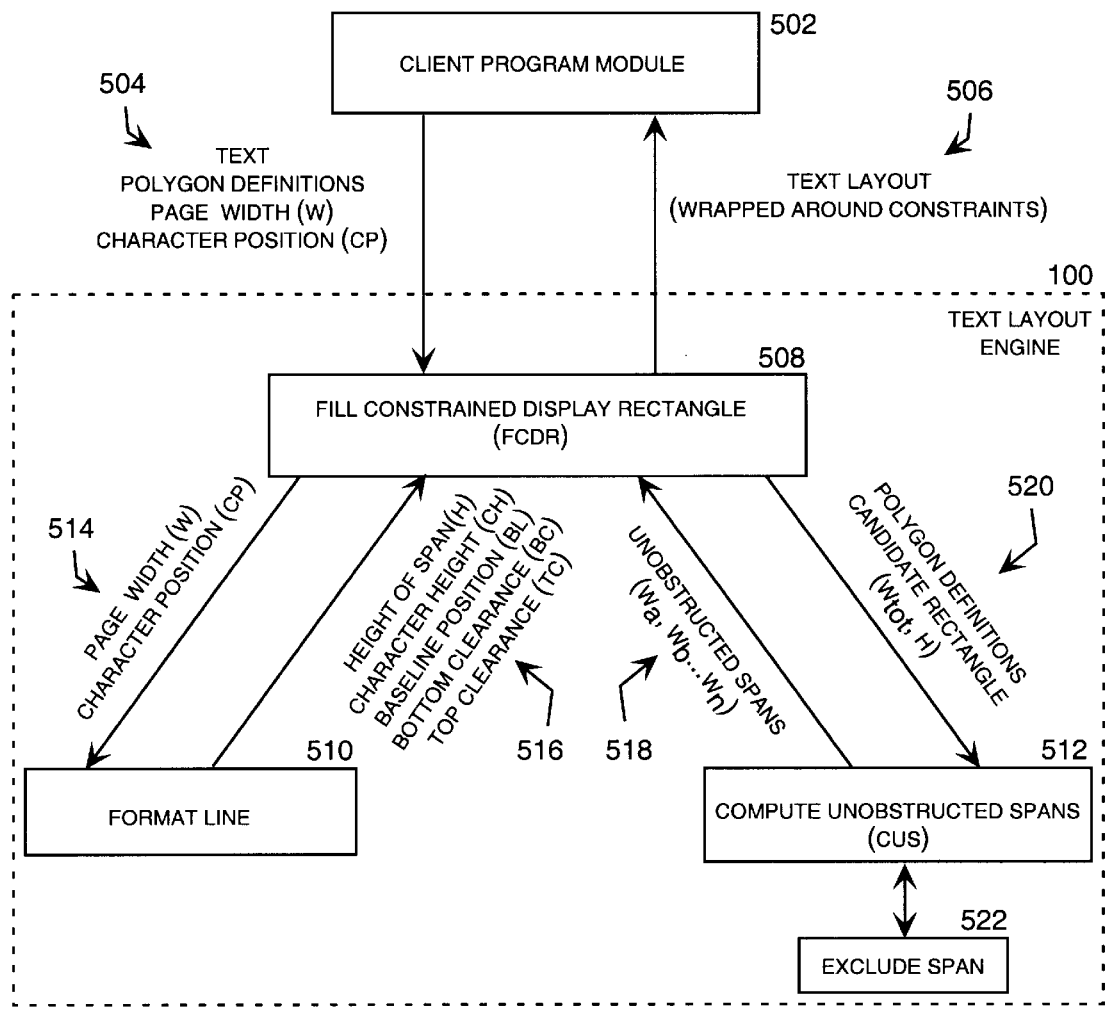
FIG. 5A is a functional block diagram illustrating the component architecture of a typical text layout engine.

FIG. 5A is a functional block diagram illustrating the component architecture of an illustrative text layout engine 100. The text layout engine 100 interacts with a text-processing client program 502, such as a word processing program, a desktop publishing program, a program for creating Internet home pages, etc. The client program 502 supplies the text layout engine 100 with parameters 504 including the text, the constraint definitions, and the document space definitions. The text is typically a set of rich-text characters, the document space definitions typically include at least the width of the document space and the current vertical and horizontal position character position, and the constraint definitions typically include a set of sorted vertices that define one or more polygons. Once all the text has been placed in the document space to avoid the constraints, the text layout engine 100 returns the text layout 506 to the client program 502.

The text layout engine 100 may be configured in three components, a Fill Constrained Display Rectangle (FCDR) module 508, a Format Line module 510, and a Compute Unobstructed Spans (CUS) module 512. The FCDR module 508 controls the operation of the text layout engine 100, interacts with the client program 502, and calls the Format Line module 510 and the CUS module 512 as necessary. The FCDR module 508 typically receives the parameters 504, including the text, the constraint definitions, and the document space definitions, from the client program 502. Alternatively, the CUS module 512 may receive the constraint definitions directly from the client program 502. Once all the text has been placed in the document space, the FCDR module 508 returns the text layout 506 to the client program 502.

The operation of the text layout engine 100 begins when the FCDR module 508 receives the parameters 504, including the width of the document space and the current vertical and horizontal position character position, from the client program 502. To determine the height of the candidate rectangle, the FCDR module 508 calls the Format Line module 510 to make a preliminary assignment of text to the full-width candidate rectangle. The FCDR module 508 passes the Format Line module 510 parameters 514, including the width and character position, which the Format Line module 510 requires to perform its text-assignment function.

Figure 5B:
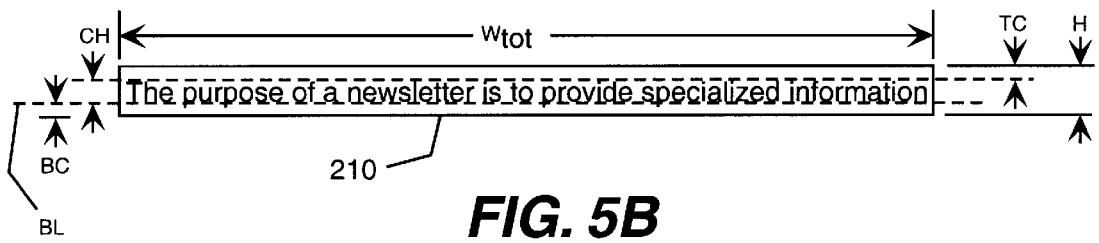
FIG. 5B illustrates certain parameters used by the text layout engine shown in FIG. 5A.

The Format Line module 510 returns a number of parameters 516, including the height of the candidate rectangle and the height, baseline position, bottom clearance, and top clearance for the characters. FIG. 5B illustrates the parameters 516, which are returned from the Format Line module 510 to the FCDR module 508.

Figure 5C:
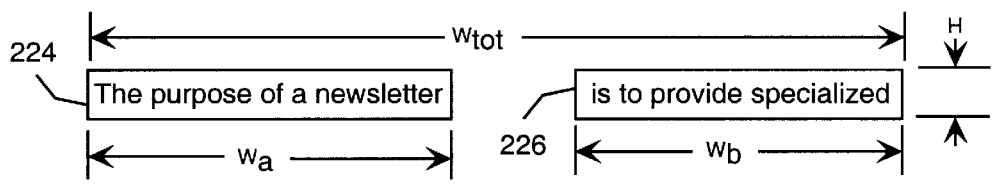
FIG. 5C illustrates additional parameters used by the text layout engine shown in FIG. 5A.

The CUS module 512 receives a set of parameters 520 that define a candidate rectangle and a constraint that may intersect the candidate rectangle. The CUS module 512 breaks the candidate rectangle to avoid the constraint and returns parameters 518 that define zero or more unobstructed spans that do not intersect the constraint. The CUS module 512 calls an Exclude Span routine 522 to exclude portions of the candidate rectangle that overlap the constraint. The Exclude Span routine 522 maintains a span array that defines the unobstructed spans corresponding to the candidate rectangle. The Exclude Span routine 522 also applies the span criteria MINWIDTH, LEFTAWAY, and RIGHTAWAY for each span. FIG. 5C illustrates parameters 518 returned by the CUS module 512. The FCDR module 508 passes the unobstructed spans on to the Format Line module 510, which assigns the text characters to the spans.

Each of the modules 508, 510, and 512 include predefined object-oriented interfaces that allow the parameters described above to be passed among the modules. The interface generalizes the text layout engine and, thus, allows a variety of different client programs to access the text layout engine. Defining a specific syntax that allows the required parameters to be passed among the modules 508, 510, and 512 is within the ken of those skilled in the art, therefore, will not be described further in this specification.

Figure 6:
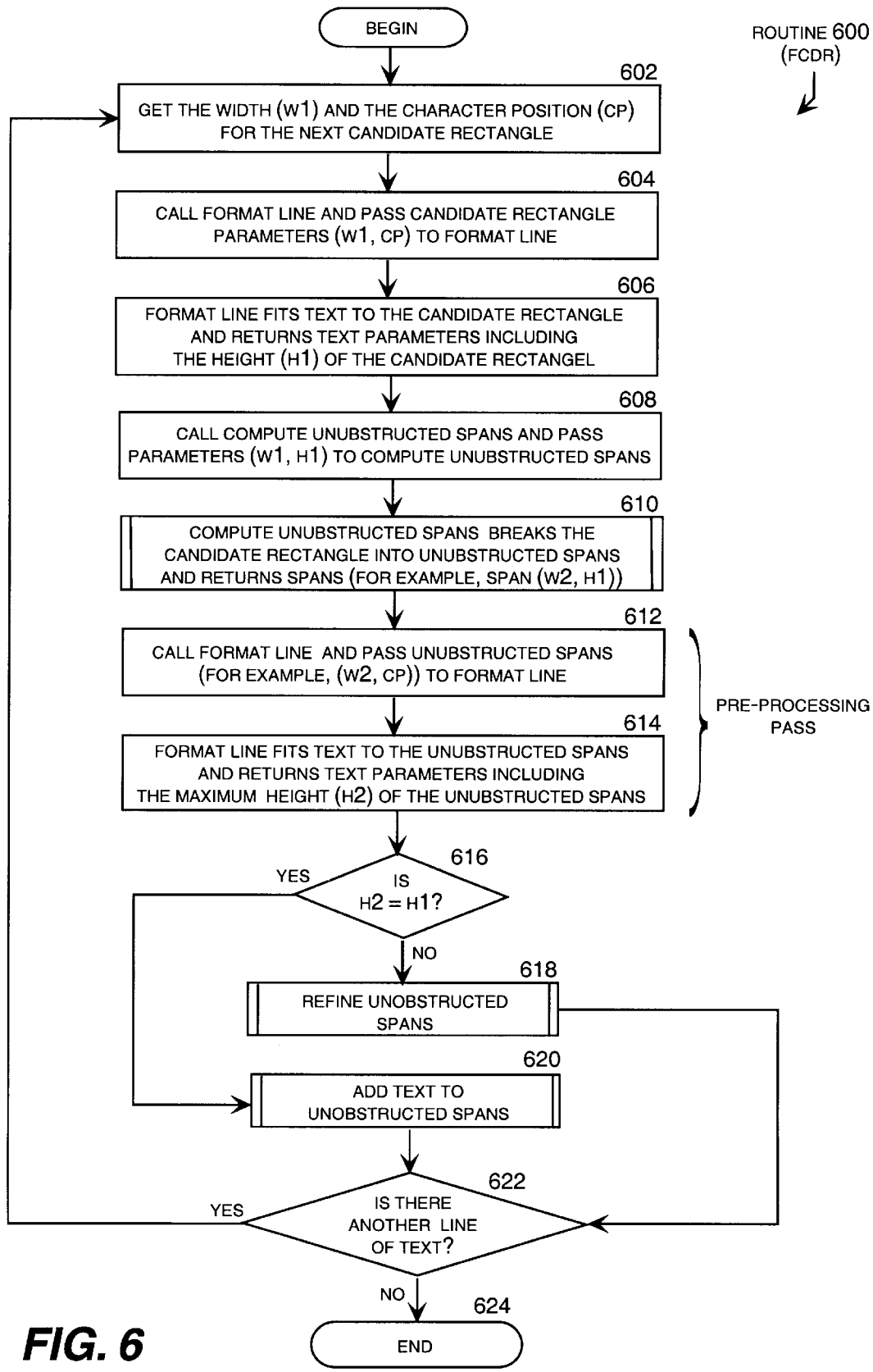
FIG. 6 is a logic flow diagram illustrating a two-pass computer algorithm for a text layout engine for placing text around polygon constraints.

FIG. 6 is a logic flow diagram illustrating a two-pass computer algorithm 600 for placing text around constraint including one or more polygons. The steps illustrated in FIG. 6 are performed by the FCDR module 508. In step 602, the FCDR module 508 receives a document space width W1 and a character position CP for a line of text from the client program 502. The parameters W1 and CP define a width, but do not define a height, for a candidate rectangle. To obtain an initial height for the candidate rectangle, step 602 is followed by step 604, in which the FCDR module 508 calls the Format Line module 510 and passes it the parameters W1 and CP.

Step 604 is followed by step 606, in which the Format Line module 510 fits text to a candidate rectangle corresponding to the parameters W1 and CP. More specifically, the Format Line module 510 fits text to a candidate rectangle extending from the character position CP to the right edge of the document space set by the parameter W1. The text assigned to the candidate rectangle determines an initial height H1 for the candidate rectangle, at this point having dimensions W1, H1. The Format Line module 510 returns the height of the candidate rectangle H1, along with the height, baseline position, bottom clearance, and top clearance for the characters, as shown in FIG. 5B, to the FCDR module 508.

Step 606 is followed by step 608, in which the FCDR module 508 calls the CUS module 512 to break the candidate rectangle W1, H1 into zero or more unobstructed spans to avoid the constraint. In step 608, the FCDR module 508 passes the CUS module 512 the parameters W1, H1 for the candidate rectangle. The FCDR module 508 may also pass the constraint parameters, which the FCDR module 508 received from the client program 502, to the CUS module 512. Alternatively, the CUS module 512 may receive the constraint parameters directly from the client program 502. Step 608 is followed by routine 610, in which the CUS module 512 breaks the candidate rectangle W1, H1 into zero or more unobstructed spans to avoid the constraint. Routine 610 is described with reference to FIG. 9–13.

The CUS module 512 returns zero or more unobstructed spans corresponding to the candidate rectangle. Each span has a width and a character position, which may be labeled W2, CP for a representative span. Routine 610 is followed by step 612, in which the FCDR module 508 calls the Format Line module 510 to assign text to the unobstructed spans corresponding to the candidate rectangle. Step 612 is followed by step 614, in which the Format Line module 510 fits text to the unobstructed spans.

Steps 612 and 614 constitute a preprocessing pass in which the Format Line module 510 assigns text to all of the unobstructed spans corresponding to the candidate rectangle (i.e., all of the unobstructed spans for a single line of the document). The Format Line module 510 returns the usual parameters, character height, baseline, and so forth, for each unobstructed span. These parameters include a new height for each unobstructed span based on the text characters assigned to the span. The maximum height for the unobstructed spans serves as the parameter H2 for further processing.

Step 614 is followed by step 616, in which the FCDR module 508 compares H2 to H1 to determine whether H2 is equal to H1. If H2 is not equal to H1, the "NO" branch is followed from step 616 to routine 618, in which the FCDR module 508 refines the spans for the candidate rectangle. Routine 618 is described with reference to FIG. 7. If H2 is equal to H1, the "YES" branch is followed from step 616 to routine 620, in which the FCDR module 508 adds the text to the spans for the candidate rectangle. Routine 620 is described with reference to FIG. 8.

Routine 620 is followed by step 622, in which the FCDR module 508 determines whether there is another line of text to be processed. If there is another line of text to be processed, the "YES" branch loops to step 602, and the FCDR module 508 receives the parameters for the next candidate rectangle from the client program 502. If there is not another line of text to be processed, the "NO" branch is followed to the "END" step 624. Thus, Routine 600 places text into the document space until all of the text supplied by the client program 502 has been processed.

Figure 7:
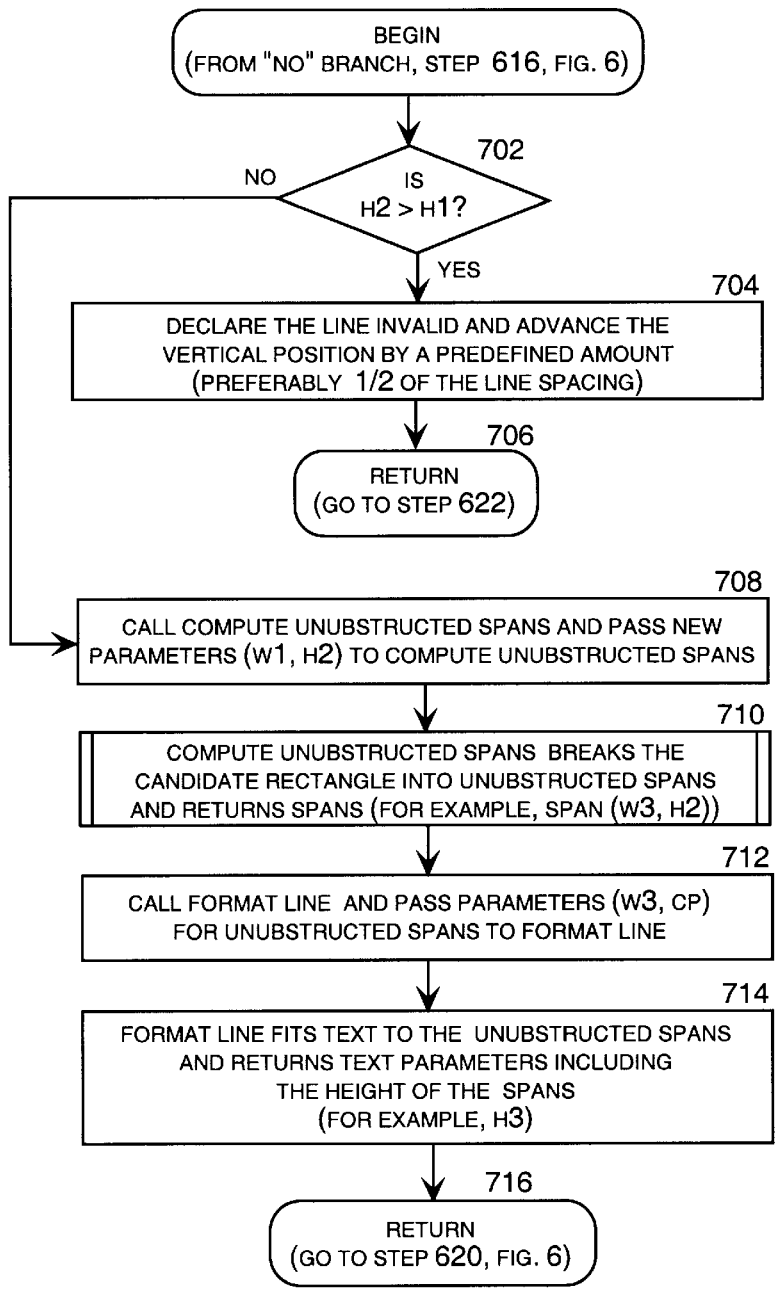
FIG. 7 is a logic flow diagram illustrating a routine for refining spans in a text layout engine.

FIG. 7 is a logic flow diagram illustrating routine 618 for refining the unobstructed spans initially returned by the CUS module 512. Routine 618 is performed by the FCDR module 508 following the "NO" branch from step 616 shown in FIG. 6. In step 702, the FCDR module 508 determines whether H2 is greater than H1, indicating that at least one of the spans is too small to accept the assigned text. If H2 is greater than H1, the "YES" branch is followed to step 704, in which the FCDR module 508 declares the line invalid and advances the line spacing by a predetermine amount, typically one-half of the line spacing for the document. Step 704 is followed by a "RETURN" step 706, which returns to step 622 shown in FIG. 6.

If H2 is not greater than H1, indicating that the spans can probably be reduced in size, the "NO" branch is followed from step 702 to step 708, in which the FCDR module 508 calls the CUS module 512 to refine the spans corresponding to the candidate rectangle. In step 708, the FCDR module 508 passes the CUS module 512 the parameters W1 and H2 for the refined candidate rectangle. Step 708 is followed by routine 710, in which the CUS module 512 breaks the refined candidate rectangle W1, H2 into unobstructed spans. The methodology of routine 710 is the same as in routine 610, which is described with reference to FIGS. 6–13.

The CUS module 512 returns zero or more unobstructed spans corresponding to the refined candidate rectangle. Each span has a width and a character position, which may be labeled W3, CP for a representative span. In step 712, the FCDR module 508 calls the Format Line module 510 to assign text to the unobstructed spans corresponding to the refined candidate rectangle. Step 712 is followed by step 714, in which the Format Line module 510 fits text to the unobstructed spans corresponding to the refined candidate rectangle. The Format Line module 510 returns the usual parameters, including a new height H3 for the representative span, resulting in a refined span having dimensions H3, W3. Step 717 is followed by the "RETURN" step 716, which returns to step 620 shown in FIG. 6.

Figure 8:
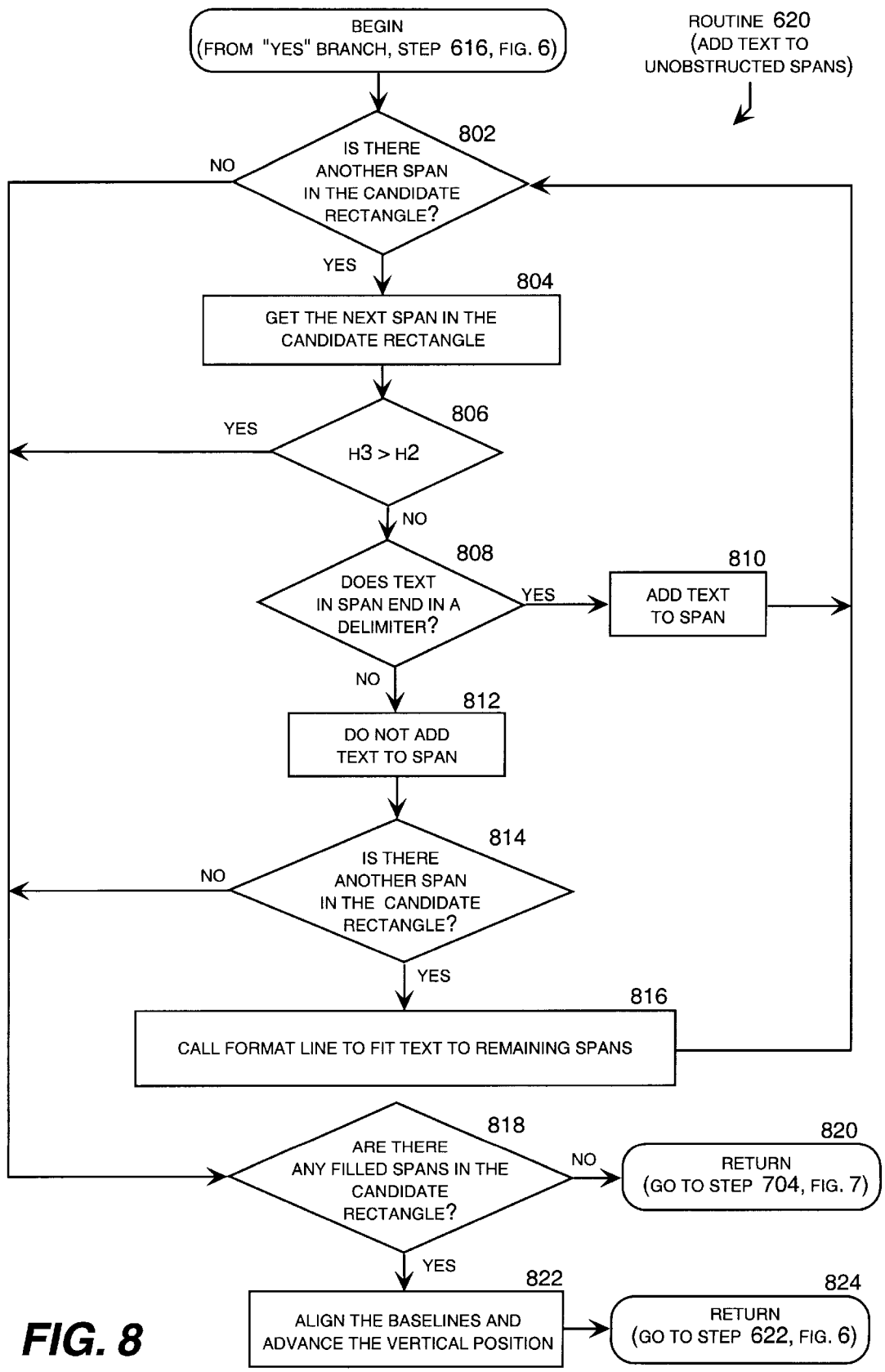
FIG. 8 is a logic flow diagram illustrating a routine for adding text to unobstructed spans in a text layout engine.

FIG. 8 is a logic flow diagram illustrating routine 620 for adding text to the unobstructed spans returned by the CUS module 512. Routine 620 is performed by the FCDR module 508 following the "YES" branch from step 616 shown in FIG. 6. In step 802, the FCDR module 508 determines whether there is another span corresponding to the candidate rectangle. If there is another span to process, the "YES" branch is followed to step 804, in which the FCDR module 508 gets the next span, such as the representative span having dimensions H3, W3.

Step 804 is followed by step 806, in which the FCDR module 508 compares H3 to H2 to determine whether H3 is greater than H2. If H3 is not greater than H2, the "NO" branch is followed from step 806 to step 808, in which the FCDR module 508 determines whether the text assigned to the span by the Format Line module 510 ends in a delimiter indicating the end of a word or a properly hyphenated word. If the text assigned to the span ends in a delimiter, the "YES" branch is followed to step 810, in which the FCDR module 508 adds the text to the span. Following step 810, routine 620 loops to step 802, in which the FCDR module 508 checks for another span.

If the text assigned to the span does not end in a delimiter, the "NO" branch is followed from step 808 to step 812, in which the FCDR module 508 does not add the text to the span. That is, the FCDR module 508 does not add the text to this particular span as assigned by the Format Line module 510. As a result, the text that is not added to its assigned span has to be reassigned to any remaining spans of the candidate rectangle. As this invalidates the previous text assignments for the remaining spans, the FCDR module 508 calls the Format Line module 510 to reassign the text for the remaining spans of the candidate rectangle.

Accordingly, step 812 is followed by step 814, in which the FCDR module 508 determines whether there is another span corresponding to the candidate rectangle. If there is another span corresponding to the candidate rectangle, the "YES" branch is followed to step 816, in which the FCDR module 508 calls the Format Line module 510 to reassign the text to the remaining spans. Following step 816, routine 620 loops to step 802, in which the FCDR module 508 checks for another span.

Referring again to steps 802 and 814, if there is not another span corresponding to the candidate rectangle, the "NO" branches are followed from steps 802 and 814, respectively, to step 818, in which the FCDR module 508 determines whether there are any filled spans in the candidate rectangle. If there are no filled spans in the candidate rectangle, the "NO" branch is followed to the "RETURN" step 820, which returns to step 704 shown in FIG. 7, in which the FCDR module 508 declares the line invalid and advances the line spacing by a predetermine amount, typically one-half of the line spacing for the document.

If there are filled spans in the candidate rectangle, the "YES" branch is followed from step 818 to step 822, in which the FCDR module 508 aligns the baselines for the spans corresponding to the candidate rectangle, typically by lowering the baselines to align with the span having the lowest baseline. Step 822 is followed by the "RETURN" step 824, which returns to step 622 shown in FIG. 6, in which the FCDR module 508 determines whether there is another line of text to be processed.

Referring again to step 806, if the FCDR module 508 encounters a span in which H3 is greater than H2, the "YES" branch is followed from step 806 to step 818. In other words, the condition H3 greater than H2 for a span causes the FCDR module 508 to stops adding text to the spans for the current line of text. Thus, beginning with the far-left span of the line of text, the FCDR module 508 adds text until it reaches a span in which H3 is greater than H2. Alternatively, the "NO" branch from step 806 could loop to step 812, in which the FCDR module 508 does not add text to the span but continues processing. In this alternative, the FCDR module 508 would add text to each span of the candidate rectangle for which H3 is not greater then H2. In addition, other conditions may be used to determine whether to retain text assigned to a line, such as whether the line starts at the left margin, whether the line includes an initial span having a minimum length, whether the line includes a minimum number of characters, or the like.

Figure 9:
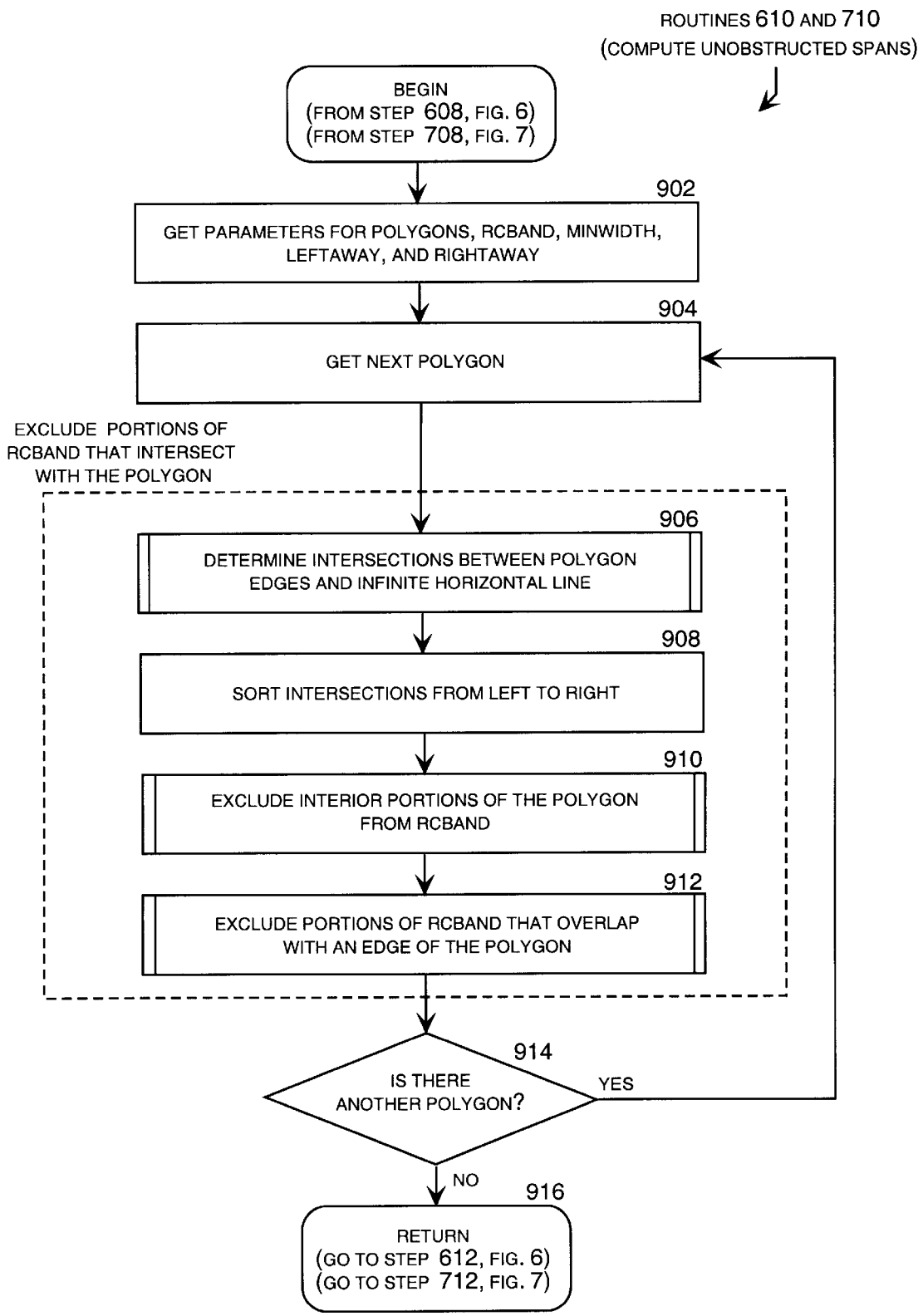
FIG. 9 is a logic flow diagram illustrating a routine for breaking a candidate rectangle into unobstructed spans in a text layout engine.

FIGS. 9–13 illustrate routines 610 and 710, which are performed by the CUS module 512 to break a candidate rectangle into unobstructed spans to avoid one or more constraints. FIG. 9 is a logic flow diagram illustrating an overview of routines 610 and 710, which begin following steps 608 shown in FIG. 6 and 708 shown in FIG. 7, respectively. In step 902, the CUS module 512 gets the constraint parameters (for the illustrative embodiment sorted vertices for one or more polygons), a candidate rectangle RCBAND, and three span criteria, MINWIDTH, LEFTAWAY, and RIGHTAWAY. As noted previously, LEFTAWAY sets a left clearance distance from the constraint, RIGHTAWAY sets a right clearance distance from the constraint LEFTAWAY, and MINWIDTH sets a minimum width value for the span.

Because the constraint parameters may define more than one polygon, step 902 is followed by step 904, in which the CUS module 512 gets the next polygon. Step 904 is followed by a group of routines 906–914 that collectively exclude portions of RCBAND that intersect with the polygon while respecting the span criteria MINWIDTH, LEFTAWAY, and RIGHTAWAY. In routine 906, the CUS module 512 determines intersections between the edges of the polygon and an infinite horizontal line. Routine 906 is described with reference to FIG. 10. Routine 906 is followed by step 908, in which the intersections determined in routine 906 are sorted horizontally from left to right. Step 908 is followed by routine 910, in which the CUS module 512 excludes the interior portions of the polygon from RCBAND. Routine 910 is described with reference to FIG. 11.

Routine 910 is followed by routine 912, in which the CUS module 512 excludes portions of the candidate rectangle RCBAND that overlap with an edge or line segment of the polygon. Routine 912 is described with reference to FIGS. 12 and 13. Routine 912 is followed by step 914, in which the CUS module 512 determines whether there is another polygon. If there is another polygon, the "YES" branch loops to step 904, in which the CUS module 512 gets the next polygon. If there is not another polygon, the "NO" branch is followed to the "RETURN" step 916, which returns to steps 612 shown in FIG. 6 and 712 shown in FIG. 7, respectively.

Figure 10:
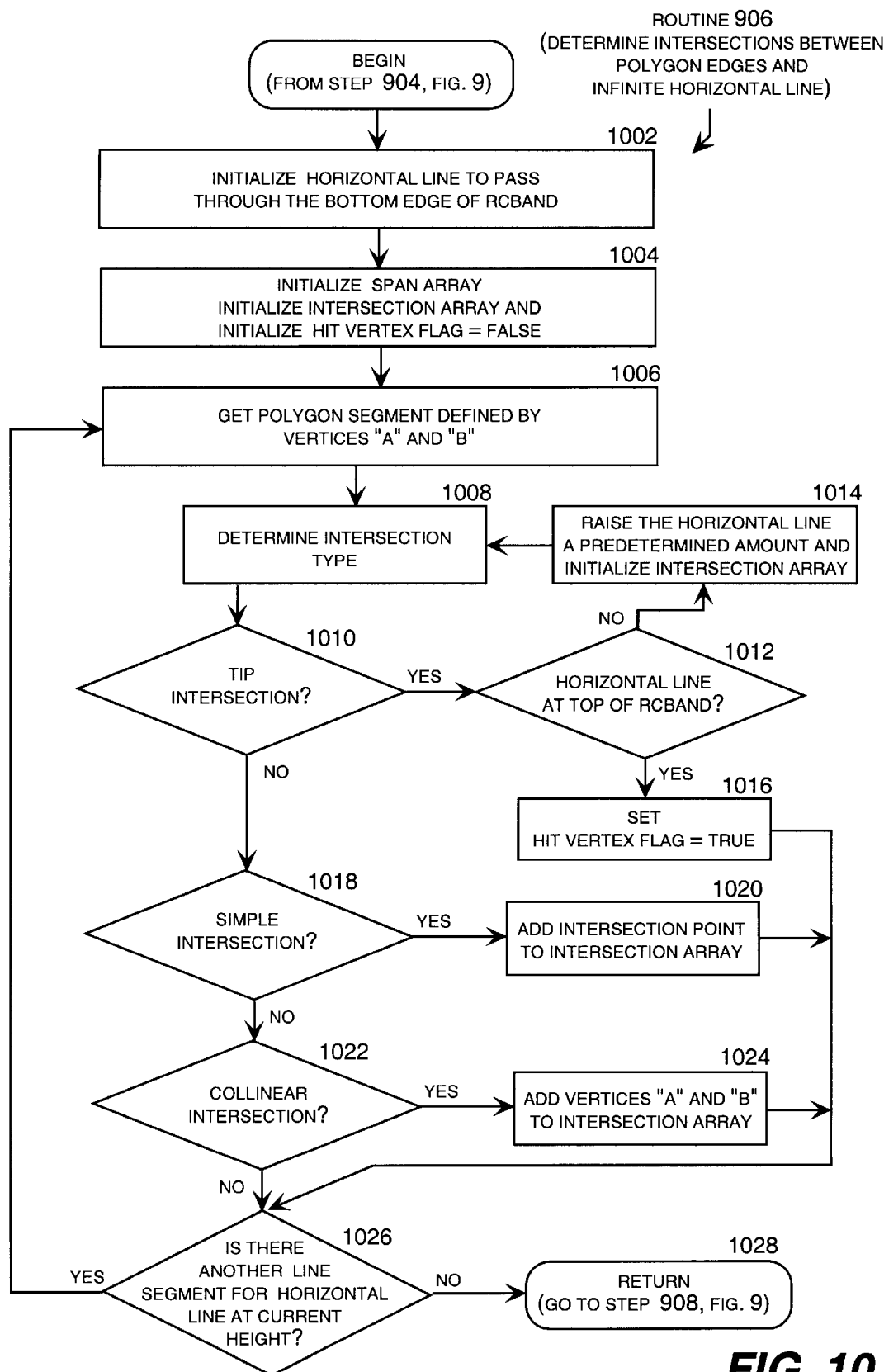
FIG. 10 is a logic flow diagram illustrating a routine for determining intersections between an infinite horizontal line and a polygon constraint in a text layout engine.

FIG. 10 is a logic flow diagram illustrating routine 906 for determining intersections between an infinite horizontal line and a polygon constraint. Routine 906 begins following step 904 shown in FIG. 9. In step 1002, the CUS module 512 initializes an infinite horizontal line to pass through the bottom of the candidate rectangle RCBAND. Step 1002 is followed by step 1004, in which the CUS module 512 initializes a span array, an intersection array, and a hit vertex flag. The span array is initialized with the far left and right horizontal coordinates of RCBAND. The intersection array is initialized by clearing the array, and the hit vertex flag is initialized to "FALSE."

Step 1004 is followed by step 1006, in which the CUS module 512 gets an edge or segment of the polygon defined by two vertices represented by vertices "A" and "B." Step 1006 is followed by step 1008, in which the CUS module 512 determines the type of intersection, if any, that occurs between the infinite horizontal line and the polygon segment "A–B." There are three possible types of intersection, a tip intersection in which the infinite horizontal line passes through vertex "A" or "B" but not both, a simple intersection in which the infinite horizontal line passes between the vertices "A" and "B," or a collinear intersection in which the infinite horizontal line passes through both vertices "A" or "B." Alternatively, there may be no intersection between the infinite horizontal line and the polygon edge "A–B." In this case, the CUS module 512 takes no action with respect to that particular polygon segment, and moves on to the next segment.

Step 1008 is followed by step 1010, in which the CUS module 512 determines whether the intersection is a tip intersection. If the intersection is a tip intersection, the "YES" branch is followed to step 1012, in which the CUS module 512 determines whether the horizontal line is presently at the top of the candidate rectangle RCBAND. If the horizontal line is not at the top of the candidate rectangle RCBAND, the "NO" branch is followed to step 1014, in which the horizontal line is moved up by a predetermined amount, typically one spacing unit (e.g., one millimeter). Also in step 1014, the intersection array is reinitialized or cleared, and the current polygon segment is reset as the first polygon segment processed by the CUS module 512 so that all of the polygon segment will be processed for the infinite horizontal line at its new position. From step 1014, routine 908 returns to step 1008, in which the CUS module 512 again determines whether the intersection is a tip intersection.

Referring again to step 1012, if the horizontal line is at the top of the candidate rectangle RCBAND, the "YES" branch is followed to step 1016, in which the CUS module 512 sets the hit vertex flag to "TRUE." Step 1016 is followed by step 1026, which is described below.

Referring again to step 1010, if the intersection is not a tip intersection, the "NO" branch is followed to step 1018, in which the CUS module 512 determines whether the intersection is a simple intersection. If the intersection is a simple intersection, the "YES" branch is followed to step 1020, in which the CUS module 512 adds the intersection point to the intersection array. Step 1020 is followed by step 1026, which is described below.

Referring again to step 1018, if the intersection is not a simple intersection, the "NO" branch is followed from step 1018 to step 1022, in which the CUS module 512 determines whether the intersection is a collinear intersection. If the intersection is a collinear intersection, the "YES" branch is followed to step 1024, in which the CUS module 512 adds the intersection points "A" and "B" to the intersection array. Step 1024 is followed by step 1026, which is described below.

Referring again to step 1022, if the intersection is not a collinear intersection, the "NO" branch is followed from step 1022 to step 1026. In addition, steps 1016, 1020, and 1022 are followed by step 1026, in which the CUS module 512 determines whether there is another line segment in the polygon for the current height setting of the infinite horizontal line. If there is another line segment, the "YES" branch loops to step 1006, in which the CUS module 512 gets the vertices for the next line segment. If there is not another line segment, the "NO" branch is followed to the "RETURN" step 1028, which returns to step 908 shown in FIG. 9.

Figure 11:
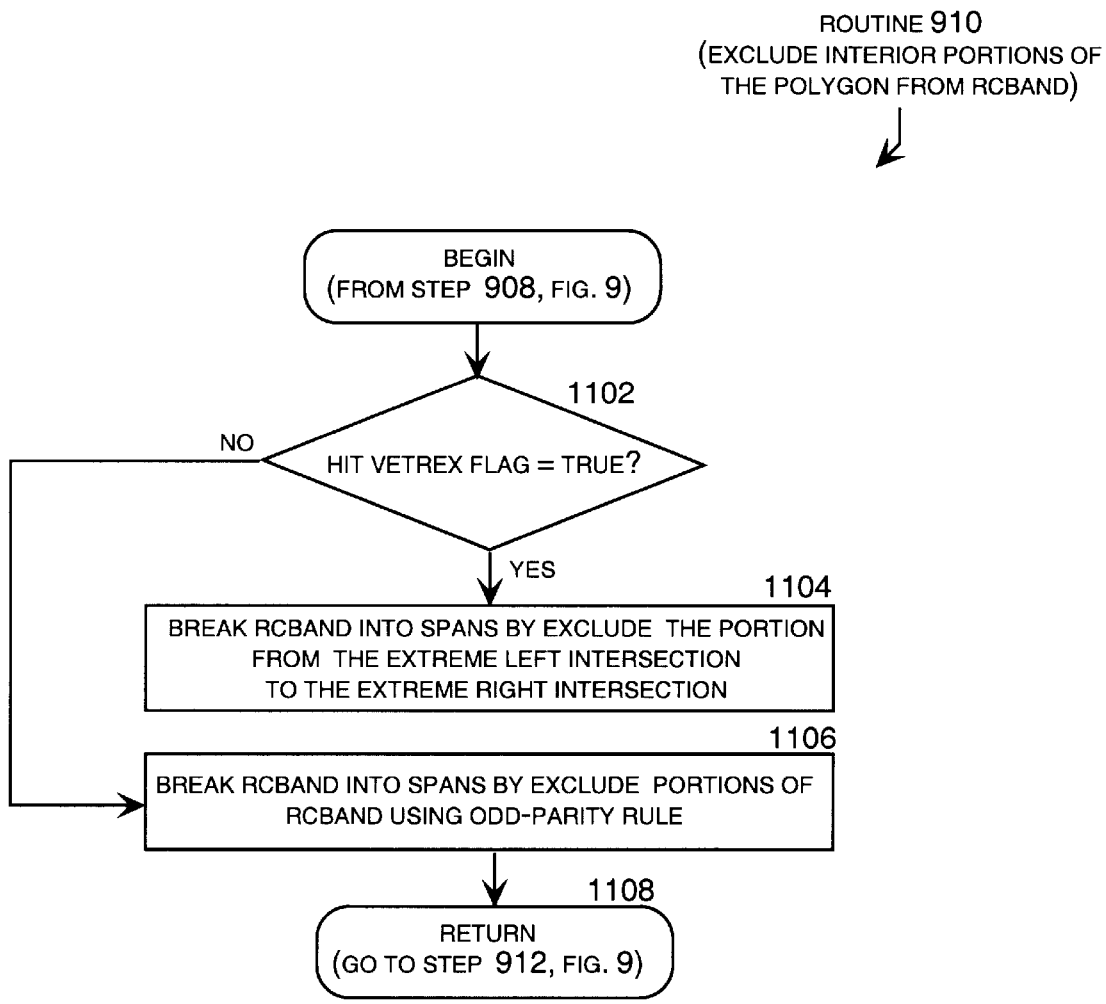
FIG. 11 is a logic flow diagram illustrating a routine for excluding interior portions of a polygon constraint from a candidate rectangle in a text layout engine.

FIG. 11 is a logic flow diagram illustrating routine 910 for excluding interior portions of the polygon constraint from the candidate rectangle RCBAND. Routine 910 begins following step 908 shown in FIG. 9, in which the CUS module 512 sorted the intersection points in the intersection array from left to right. In step 1102, the CUS module 512 checks whether the hit vertex flag is set to "TRUE." if the hit vertex flag is set to "TRUE," the "YES" branch is followed the step 1104, in which the CUS module 512 excludes the portion of RCBAND from the extreme left intersection point to the extreme right intersection point in the intersection array. Specifically, the CUS module 512 calls a routine known as "Exclude Span," which determines which coordinates to add to the span array to exclude a particular span from the candidate rectangle. In this case, the Exclude Span routine adds the extreme left intersection point and the extreme right intersection point to the span array. The Exclude Span routine is described in greater detail with reference to FIGS. 12 and 13.

Referring again to step 1102, if the hit vertex flag is set to "FALSE," the "NO" branch is followed to step 1106, in which the CUS module 512 excludes the portion of RCBAND by applying the odd-parity rule to the intersection points in the intersection array. Step 1106 is followed by the "RETURN" step 1108, which returns to routine 912 shown on FIG. 9.

Figure 12:
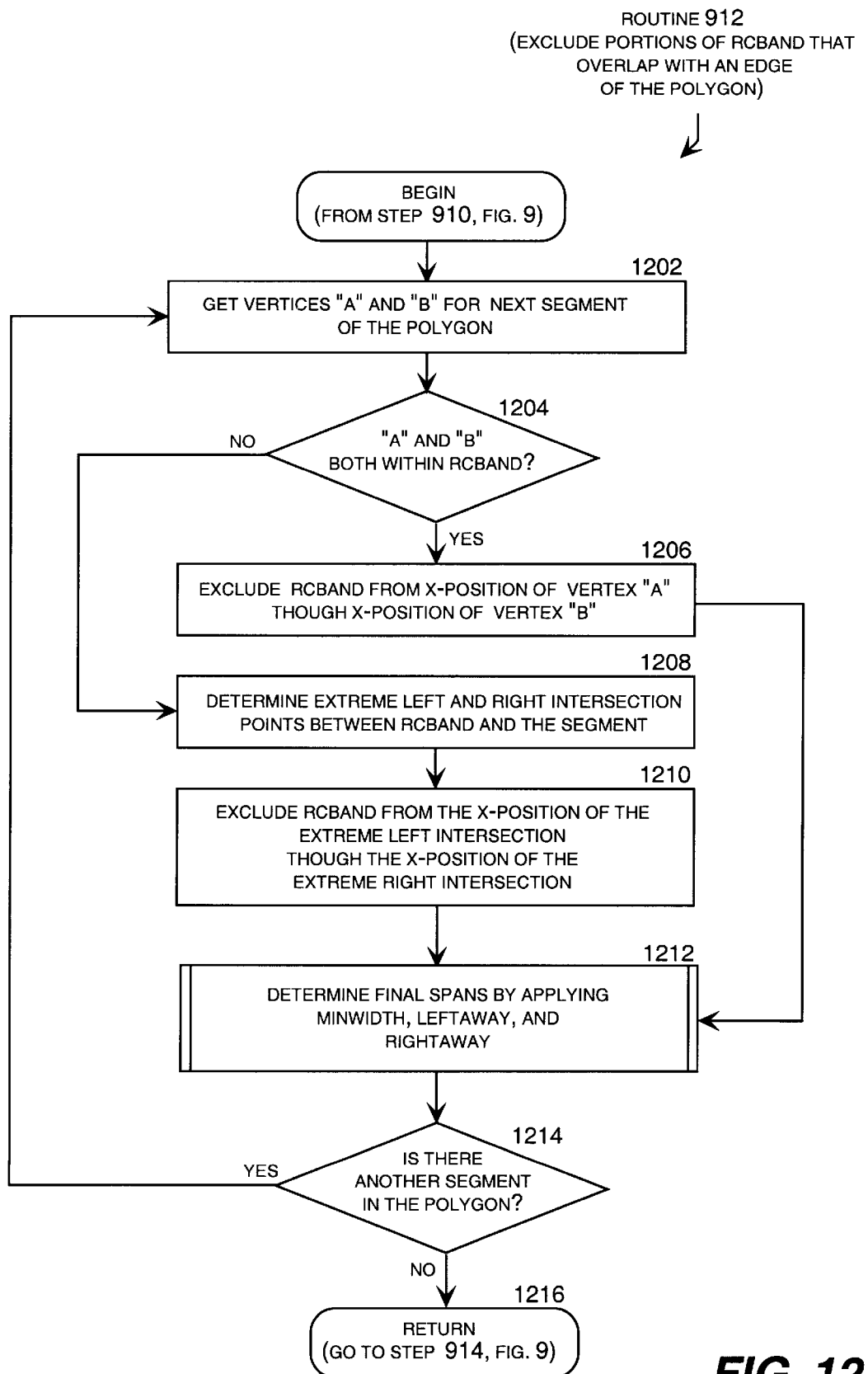
FIG. 12 is a logic flow diagram illustrating a routine for excluding from a candidate rectangle portions that overlap with the edge of a polygon constraint in a text layout engine.

FIG. 12 is a logic flow diagram illustrating routine 912 for excluding from a candidate rectangle portions that overlap with the edge of the polygon constraint. The CUS module performs routine 912, which begins following routine 910 shown in FIG. 9. In step 1202, the CUS module 512 gets the vertices "A" and "B" for a segment of the polygon. Step 1202 is followed by step 1204, in which the CUS module 512 determines whether the vertices "A" and "B" are both within the candidate rectangle RCBAND. If the vertices "A" and "B" are both within RCBAND, the "YES" branch is followed to step 1206, in which the CUS module 512 calls the Exclude Span routine 522, which excludes the portion of RCBAND from vertex "A" to vertex "B." Specifically, the CUS module 512 adds the horizontal coordinates for vertices "A" and "B" to the span array.

More specifically, in step 1206 the Exclude Span routine 522 determines which coordinates to add to the span array to exclude the span from the candidate rectangle. To determine which coordinates to add to the span array, the Exclude Span routine 522 takes account of overlapping spans and other factors to ensure that the span array includes coordinates that define the minimum number of non-overlapping unobstructed spans corresponding to the candidate rectangle. Step 1206 is followed by step 1212, in which the Exclude Span applies the MINWIDTH, LEFTAWAY, and RIGHTAWAY criteria as it defines each span. Routine 1212 is described with reference to FIG. 13.

The Exclude Span routine may also implement other functionality, such as "avoid left" and "avoid right" commands. "Avoid left" means that text is not permitted to flow around the left side of the constraint. Similarly, "avoid right" means that text is not permitted to flow around the right side of the constraint. To implement the "avoid left" and "avoid right" commands, Exclude Span removes the portion of the candidate rectangle to the left or to the right of the constraint, respectively.

Referring again to step 1204, if the vertices "A" and "B" are not both within RCBAND, the "NO" branch is followed from step 1204 to step 1208, in which the CUS module 512 determines the extreme left and right intersection points between the segment "A–B" and the candidate rectangle RCBAND. Step 1208 is followed by step 1210, in which the CUS module 512 calls the Exclude Span routine 522, which excludes the portion of RCBAND between the extreme left and right intersection points. Specifically, the Exclude Span routine 522 adds the horizontal coordinates for the extreme left and right intersection points to the span array. Note that an intersection point could occur in the interior of RCBAND if one vertex is within RCBAND. If this is the case, the horizontal coordinate of the enclosed vertex serves as the intersection point that is added to the span array.

Steps 1206 and 1210 are followed by routine 1212, in which the Exclude Span routine 522 applies the MINWIDTH, LEFTAWAY, and RIGHTAWAY criteria as it defines each span. Routine 1212 is described with reference to FIG. 13. Routine 1212 is followed by step 1214, in which the CUS module 512 determines whether there is another segment to process for the current polygon. If there is another segment to process, the "YES" branch loops to step 1202, in which the CUS module 512 gets the next segment. If there is not another segment to process, the "NO" is followed to the "RETURN" step 1216, which returns to step 914 shown in FIG. 9.

Figure 13:
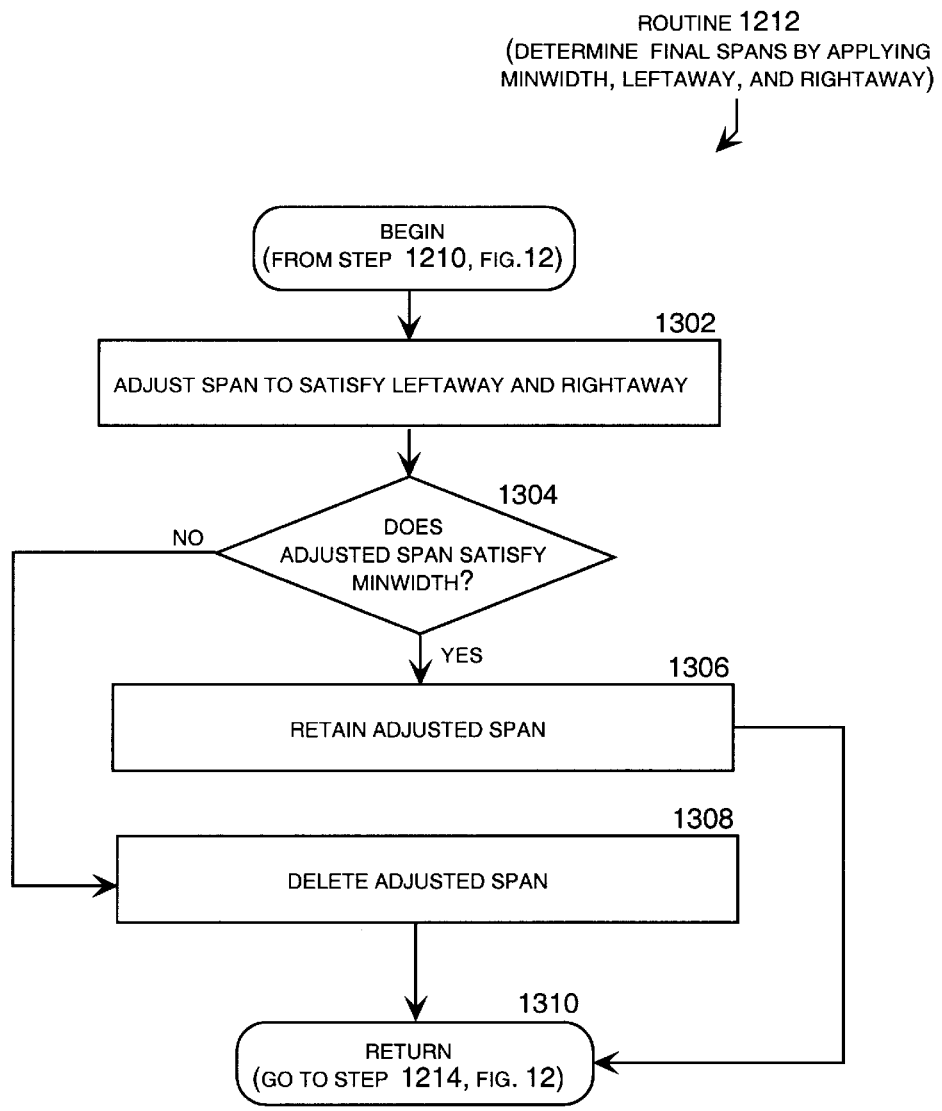
FIG. 13 is a logic flow diagram illustrating a routine for determining final spans in a text layout engine.

FIG. 13 is a logic flow diagram illustrating routine 1212 for determining final spans by applying the span criteria MINWIDTH, LEFTAWAY, and RIGHTAWAY. Routine 914 begins following step 1210 shown in FIG. 12. In step 1302, the Exclude Span routine 522 adjusts the span to satisfy the LEFTAWAY and RIGHTAWAY criteria. Specifically, the Exclude Span routine 522 adjusts the horizontal coordinates for the span in the span array to satisfy the LEFTAWAY and RIGHTAWAY criteria.

Step 1302 is followed by step 1304, in which the Exclude Span routine 522 determines whether the adjusted span satisfies the MINWIDTH criterion. If the adjusted span satisfies the MINWIDTH criterion, the "YES" branch is followed to step 1306, in which the Exclude Span routine 522 retains the adjusted span. If the adjusted span does not satisfy the MINWIDTH criterion, the "NO" branch is followed to step 1308, in which the Exclude Span routine 522 deletes the adjusted span.

Steps 1306 and 1308 are followed by the "RETURN" step 1310, which returns to step 1214 shown in FIG. 12, in which the CUS module 512 determines whether there is another span to be processed for the current candidate rectangle. Thus, routine 1212 produces unobstructed spans that avoid all of the polygons and respect the criteria MINWIDTH, LEFTAWAY, and RIGHTAWAY.

In view of the foregoing, it will be appreciated that the invention provides a text layout engine having improved processing speed and text-placement precision for use with rich-text documents. The two-pass text placement procedure allows the text layout engine to determine the appropriate height and width for each span of a candidate rectangle before attempting to add the text to the spans. Rich-text characters are placed around the constraint without causing the characters to overlap the constraint and without having to resort to an iterative text placement procedure. For candidate rectangles that cannot accept text, the text layout engine advances the vertical position by a predefined amount, such as one-half of the line spacing for the document, until the candidate rectangle is large enough the accept text. These features allow the text layout engine to exhibit improved processing speed and text placement precision, as compared to previous text layout modules.

It should be understood that the foregoing relates only to the exemplary embodiments of the present invention, and that numerous changes may be made therein without departing from the spirit and scope of the invention as defined by the following claims.

The invention claimed is:

1. A computer-readable medium storing computer-executable instructions for performing the steps of:

receiving a first width, a character position, and a vertical position associated with a candidate rectangle;

receiving parameters defining a constraint that intersects with the candidate rectangle;

fitting a first text string to the candidate rectangle;

determining a first height associated with the first text string;

conducting a preliminary text assignment to identify an unobstructed span corresponding to the candidate rectangle, the unobstructed span associated with a second height;

comparing the second height to the first height;

if the second height is equal to the first height, determining whether a second text string fitted to the unobstructed span ends in a delimiter, and if the second text string ends in a delimiter, assigning the second text string to the unobstructed span;

if the second height is greater than the first height, declaring the candidate rectangle invalid and advancing the vertical position by a predetermined amount; and if the second height is less than the first height refining the unobstructed span.

2. The computer-readable medium of claim 1, wherein the step of conducting a preliminary text assignment comprises the steps of:

identifying the unobstructed span by excluding from the candidate rectangle a portion of the candidate rectangle that intersects with the constraint; and determining the second height by fitting the second text string to the unobstructed span.

3. The computer-readable medium of claim 1, further comprising the steps of:
   if the second text string fitted to the unobstructed span does not end in a delimiter, assigning no text to the unobstructed span.

4. The computer-readable medium of claim 1, wherein the constraint comprises a polygon.

5. The computer-readable medium of claim 1, wherein the constraint comprises a plurality of polygons.

6. The computer-readable medium of claim 1, wherein the constraint comprises an exterior of a polygon such that the second text string is assigned to the interior of the polygon.

7. The computer-readable medium of claim 1, wherein the constraint comprises a smooth curve.

8. The computer-readable medium of claim 1, wherein the step of refining the unobstructed span comprises the steps of:
   defining a second candidate rectangle having the first width and the second height;
   identifying a second unobstructed span corresponding to the second candidate rectangle by excluding from the second candidate rectangle the portion of the second candidate rectangle that intersects with the constraint;
   fitting a third text string to the second unobstructed span;
   determining a third height associated with the third text string;
   comparing the third height to the second height;
   if the third height is equal to or less than the second height, assigning the third text string to the second unobstructed span; and
   if the third height is greater than the second height, declaring the second candidate rectangle invalid and advancing the vertical position by a predetermined amount.

9. The computer-readable medium of claim 1, wherein the step of identifying the unobstructed span corresponding to the candidate rectangle comprises the steps of:
   determining intersections between the constraint and an infinite horizontal line; and
   based on the intersections between the constraint and an infinite horizontal line, excluding interior portions of the constraint from the candidate rectangle.

10. The computer-readable medium of claim 9, wherein the step of determining the unobstructed span corresponding to the candidate rectangle further comprises the steps of:
    excluding from the candidate rectangle portions of the candidate rectangle that overlap with edges associated with the constraint.

11. The computer-readable medium of claim 10, wherein the step of determining the unobstructed span corresponding to the candidate rectangle further comprises the steps of:
    excluding from the candidate rectangle portions of the candidate rectangle that are within a predefined left clearance criterion from a left edge associated with the constraint; and
    excluding from the candidate rectangle portions of the candidate rectangle that are within a predefined right clearance criterion from a right edge associated with the constraint.

12. The computer-readable medium of claim 11, wherein the step of determining the unobstructed span corresponding to the candidate rectangle further comprises the steps of:
    determining whether the unobstructed span has a width that is at least as large as a predefined minimum width criterion.

13. The computer-readable medium of claim 9, wherein the step of determining intersections between the constraint and an infinite horizontal line comprises the steps of:
    initializing the horizontal line to pass through a bottom side of the candidate rectangle;
    initializing an intersection array;
    for each of a plurality of line segments defining the polygon, each line segment defined by two adjacent vertices of the polygon,
      determining an intersection type between the horizontal line and the line segment;
      if the intersection type is a tip intersection, raising the horizontal line a predetermined amount and clearing the intersection array,
      if the intersection type is a simple intersection, adding a point of intersection associated with the simple intersection to the intersection array, and
      if the intersection type is a collinear intersection, adding the vertices associated with the line segment to the intersection array.

14. The computer-readable medium of claim 13, wherein the step of excluding interior portions of the constraint from the candidate rectangle comprises the step of applying an odd-parity rule to information in the intersection array.

15. The computer-readable medium of claim 14, wherein the step of excluding interior portions of the constraint from the candidate rectangle further comprises the step of:
    if the horizontal line passes through a top side associated with the candidate rectangle and the intersection type is a vertex intersection, excluding from the candidate rectangle a portion defined by an extreme left intersection to an extreme right intersection in the intersection array.

16. In or for a computer system, a method for placing text around constraints the steps of:
    receiving a first width, a character position, and a vertical position associated with a first candidate rectangle;
    receiving parameters defining a constraint that intersects with the first candidate rectangle;
    fitting a preliminary text string to the first candidate rectangle;
    determining a first height associated with the preliminary text string;
    identifying a first set of unobstructed spans corresponding to the candidate rectangle by excluding from the candidate rectangle a portion of the candidate rectangle that intersects with the constraint;
    fitting a first set of text strings to the first set of unobstructed spans;
    determining a second height associated with the first set of text strings;
    comparing the second height to the first height;
    if the second height is equal to the first height, assigning the first set of text string to the first set of unobstructed spans and aligning a baseline associated with the first set of text strings;
    if the second height is greater than the first height, declaring the first candidate rectangle invalid and advancing the vertical position by a predetermined amount; and
    if the second height is less than the first height,
      defining a second candidate rectangle having the first width and the second height,
      identifying a second set of unobstructed spans corresponding to the second candidate rectangle by excluding from the second candidate rectangle a portion of the second candidate rectangle that intersects with the constraint, fitting a second set of text strings to the second set of unobstructed spans, determining a third height associated with the second set of text strings, comparing the third height to the second height, if the third height is equal to or less than the second height, assigning the second set of text strings to the second set of unobstructed spans for each unobstructed span of the second set of unobstructed spans by, determining whether a text string fitted to an unobstructed span ends in a delimiter, if the fitted text string ends in a delimiter, assigning the text string to the unobstructed span, and if the fitted text string does not end in a delimiter, assigning no text to the unobstructed span, and if the third height is greater than the second height, declaring the second candidate rectangle invalid and advancing the vertical position by a predetermined amount.

17. The method of claim 16, wherein the constrain is select from the group comprising:

a polygon;

a plurality of polygons a smooth curve; and an exterior of a polygon such that the second text string is assigned to the interior of the polygon.

18. The method of claim 16, wherein each unobstructed span of the second set of unobstructed spans has an associated baseline, further comprising the steps of:

aligning a baselines associated with the unobstructed span of the second set of unobstructed spans.

19. A computer-readable medium storing computer-executable instructions for implementing a text layout engine comprising:

a first module for receiving text characters, constraint parameters, a page width, and a character position from the client module and returning to the client module the text characters placed around the constraint in unobstructed spans with the text characters fitted to each unobstructed span ending in a delimiter;

a second module for receiving the page width and the character position from the first module, fitting a portion of the text characters to a candidate rectangle corresponding to the page width and the character position, and returning to the first module a height associated with the text characters fit to the candidate rectangle; and a third module for receiving the candidate rectangle and the constraint parameters from the first module, identifying unobstructed spans corresponding to the candidate rectangle by excluding from the candidate rectangle a portion of the candidate rectangle that intersects with the constraint.

20. The text layout engine of claim 19, wherein the third module performs the steps of:

determining intersections between the constraint and an infinite horizontal line;

based on the intersections between the constraint and an infinite horizontal line, excluding interior portions of the constraint from the candidate rectangle;

excluding from the candidate rectangle portions of the candidate rectangle that overlap with edges associated with the constraint;

excluding from the candidate rectangle portions of the candidate rectangle that are within a predefined left clearance criterion from a left edge associated with the constraint;

excluding from the candidate rectangle portions of the candidate rectangle that are within a predefined right clearance criterion from a right edge associated with the constraint; and determining whether the unobstructed span has a width that is at least as large as a predefined minimum width criterion.

* * * * *